US012615269B2

(12) United States Patent
Takeuchi et al.

(10) Patent No.: US 12,615,269 B2
(45) Date of Patent: Apr. 28, 2026

(54) DETECTION RULE OUTPUT METHOD, SECURITY SYSTEM, AND DETECTION RULE OUTPUT DEVICE

(71) Applicant: Panasonic Automotive Systems Co., Ltd., Kanagawa (JP)

(72) Inventors: Akihito Takeuchi, Osaka (JP); Nobutaka Kawaguchi, Osaka (JP); Yuishi Torisaki, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 170 days.

(21) Appl. No.: 18/441,826

(22) Filed: Feb. 14, 2024

(65) Prior Publication Data

US 2024/0223581 A1 Jul. 4, 2024

Related U.S. Application Data

(63) Continuation of application No. PCT/JP2022/024699, filed on Jun. 21, 2022.

(30) Foreign Application Priority Data

Aug. 19, 2021 (JP) ................................. 2021-134255

(51) Int. Cl.
*H04L 9/40* (2022.01)
*G06F 21/55* (2013.01)
*H04L 67/12* (2022.01)

(52) U.S. Cl.
CPC ...... *H04L 63/1416* (2013.01); *H04L 63/1425* (2013.01); *H04L 67/12* (2013.01)

(58) Field of Classification Search
CPC . H04L 63/1416; H04L 63/1425; H04L 67/12; G06F 21/55
See application file for complete search history.

(56) References Cited

U.S. PATENT DOCUMENTS

2015/0191135 A1 7/2015 Ben Noon et al.
2015/0191136 A1 7/2015 Ben Noon et al.
(Continued)

FOREIGN PATENT DOCUMENTS

JP 6382724 8/2018

OTHER PUBLICATIONS

International Search Report issued in International Pat. Appl. No. PCT/JP2022/024699, dated Sep. 13, 2022, along with an English language translation thereof.

*Primary Examiner* — Oleg Survillo
(74) *Attorney, Agent, or Firm* — Greenblum & Bernstein, P.L.C.

(57) ABSTRACT

A detection rule output method is a detection rule output method for outputting a detection rule used in a security system that determines attack details based on log information of a vehicle, the detection rule output method including: acquiring vehicle configuration information regarding a configuration of an in-vehicle network provided in the vehicle, intrusion detection system (IDS) information regarding one or more intrusion detection systems (IDSes) mounted in the vehicle, and attack information to be detected regarding an attack on the vehicle to be detected; and outputting, to a storage device included in the security system, the detection rule that is a detection rule for detecting a location in the vehicle where an abnormality has occurred and the abnormality that has occurred in the location, and is generated based on the vehicle configuration information, the IDS information, and the attack information to be detected.

17 Claims, 17 Drawing Sheets

(56)　　　　　References Cited

U.S. PATENT DOCUMENTS

| | | | | |
|---|---|---|---|---|
| 2015/0191151 | A1 | 7/2015 | Ben Noon et al. | |
| 2015/0195297 | A1* | 7/2015 | Ben Noon | H04L 67/12 |
| | | | | 726/22 |
| 2020/0034531 | A1* | 1/2020 | Seki | B60R 25/241 |
| 2021/0075807 | A1* | 3/2021 | Park | H04L 9/0894 |
| 2022/0182404 | A1* | 6/2022 | Kishikawa | H04L 63/1416 |
| 2023/0109507 | A1* | 4/2023 | Kim | B60R 25/30 |
| | | | | 726/25 |
| 2023/0283617 | A1* | 9/2023 | Tasaki | G06F 21/55 |
| | | | | 726/22 |
| 2023/0283622 | A1* | 9/2023 | Vu | H04L 67/12 |
| | | | | 726/1 |

* cited by examiner

FIG. 1

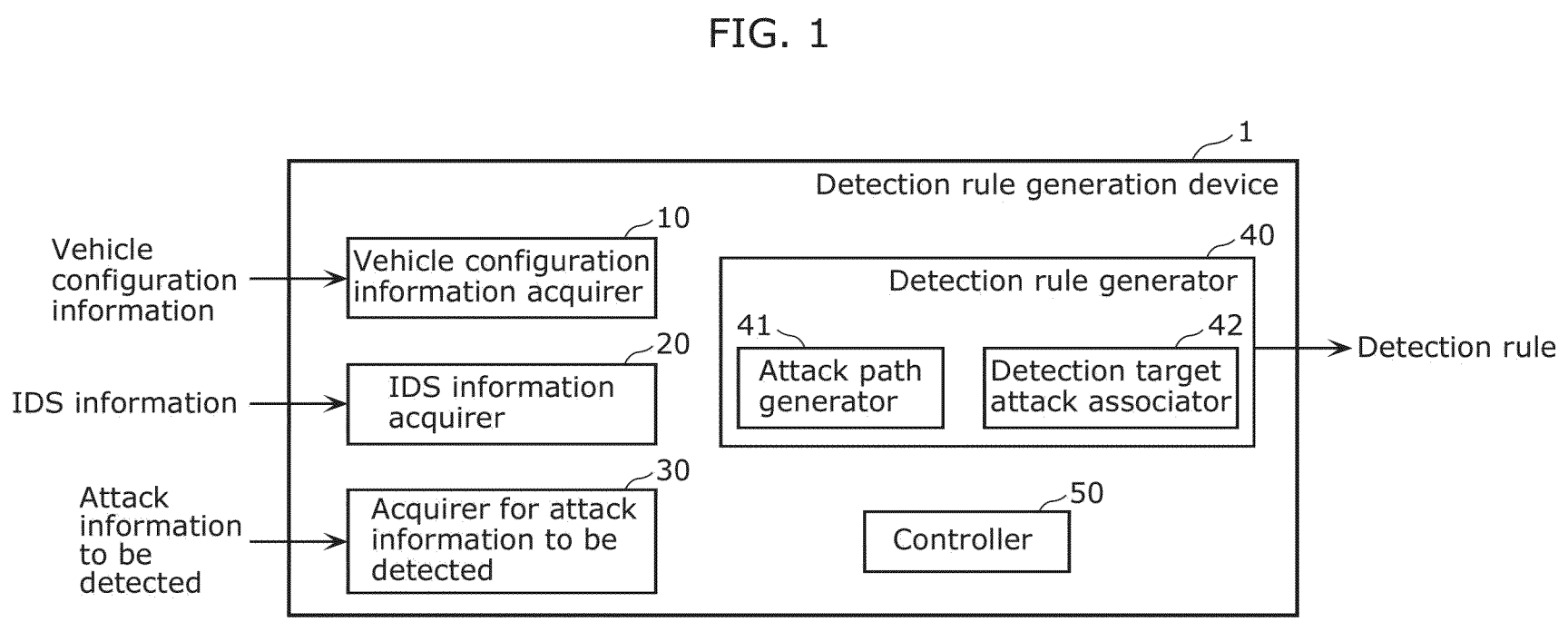

Detection rule generation device 1

Vehicle configuration information → Vehicle configuration information acquirer 10

IDS information → IDS information acquirer 20

Attack information to be detected → Acquirer for attack information to be detected 30

Detection rule generator 40

Attack path generator 41

Detection target attack associator 42

Controller 50

→ Detection rule

Vehicle configuration information

| Item | Details |
|---|---|
| Vehicle-mounted ECU | ECU identification information and installation locations of ECUs |
| EP/AT | ECU information for identifying ECUs that can function as entry point (EP) and attack target (AT) |
| Connection relationship | Connection relationship between ECUs |

Connection relationship

FIG. 3A

IDS information

| Item | Details |
|---|---|
| Monitoring IDS | IDSes that monitor ECUs |
| Output detection log | Detection log output when an IDS detects an abnormality |

FIG. 3B

Output detection log

| Detection log | Attack details |
|---|---|
| Authentication error | Unauthorized device connection |
| Repro error | Unauthorized repro |
| Frequency abnormality | DoS attack |
| ⋮ | ⋮ |

FIG. 4

Attack information to be detected

| Item | Details |
|---|---|
| Detection target attack | Attacks that need to be detected when they occur in the vehicle |

FIG. 5

Description of generation of detection rule

| Item | | Details | Input information used |
|---|---|---|---|
| Lv.1 | Degree of progress of attack | Depth (hop count) from entry point and layer count (first layer, second layer, ....) | Vehicle-mounted ECU, EP/AT, and connection relationship |
| Lv.2 | Attack path | Path extending from entry point as start point to attack target as end point, derived based on connection relationship between ECUs | Vehicle-mounted ECU, EP/AT, and connection relationship |
| | Abnormality details | Details of abnormality detected in each ECU and detection log output when the abnormality is detected | Vehicle-mounted ECU, monitoring IDS, output detection log, and detection target attack |
| Lv.3 | Attack scenario | Scenario that represents a sequence of abnormalities that occur in ECUs based on attack path (combination of attack path and abnormality details) | Vehicle-mounted ECU, EP/AT, connection relationship, monitoring IDS, output detection log, and detection target attack |

FIG. 6

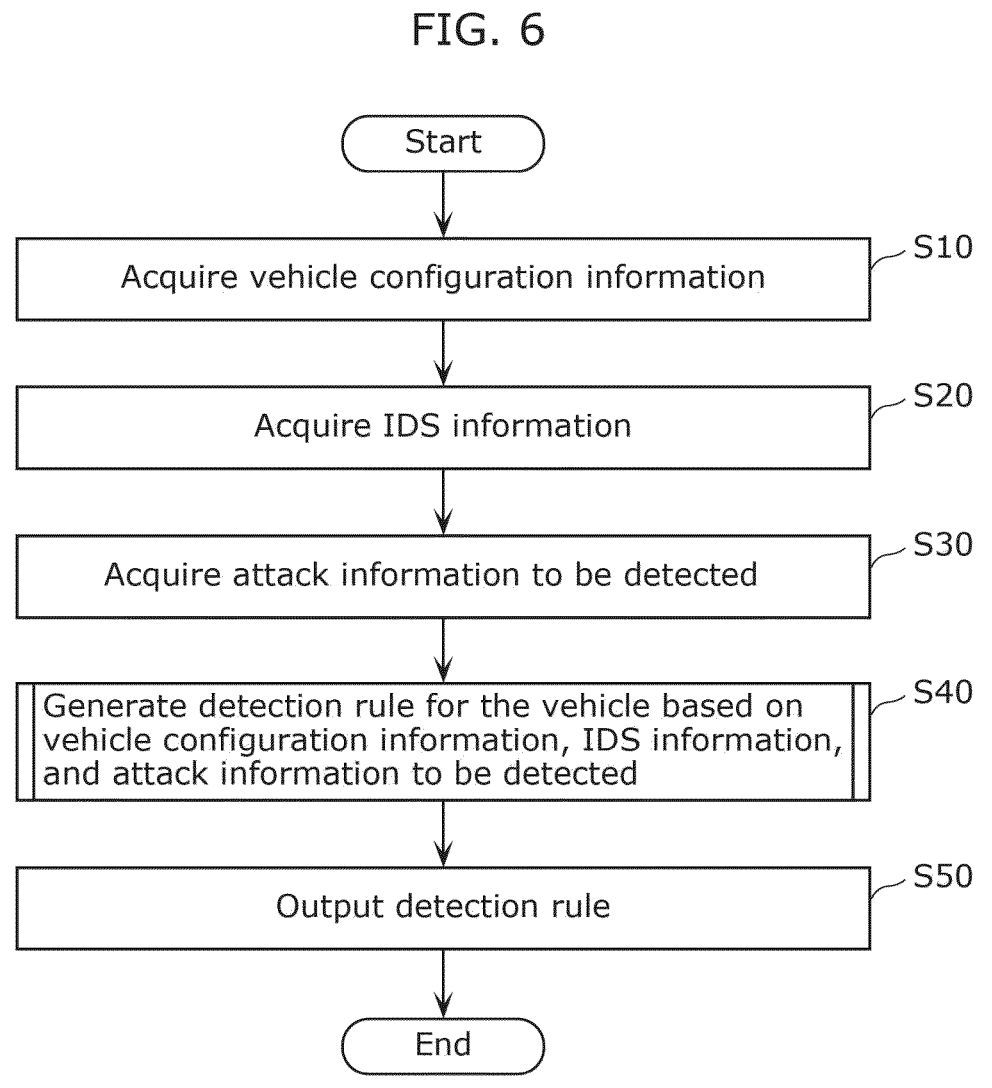

Start

Acquire vehicle configuration information    S10

Acquire IDS information    S20

Acquire attack information to be detected    S30

Generate detection rule for the vehicle based on vehicle configuration information, IDS information, and attack information to be detected    S40

Output detection rule    S50

End

S40

( Generate detection rule for the vehicle based on vehicle configuration information, IDS information, and attack information to be detected )

↓

Identify mounting location of each ECU ─ S110

↓

Assign, to each ECU, hop count or layer count when an abnormality occurs ─ S120

↓

( End )

Detection rule

| ECU | Hop count |
|------|-----------|
| EP1 | 1 |
| ECU1 | 2 |
| ECU2 | 2 |
| ECU3 | 3 |
| AT2 | 4 |
| ... | ... |

Detection rule

| ECU | Depth |
|------|-------|
| EP1 | 1 |
| ECU1 | 2 |
| ECU2 | 2 |
| ECU3 | 2 |
| AT2 | 3 |
| ... | ... |

S40

Generate detection rule for the vehicle based on vehicle configuration information, IDS information, and attack information to be detected

↓

Determine attack start point (EP) and attack end point (AT) — S210

↓

Comprehensively derive attack path — S220

↓

End

Detection rule

| No | STEP1 | STEP2 | STEP3 | STEP4 |
|---|---|---|---|---|
| 1 | EP1 | AT1 | | |
| 2 | EP1 | ECU1 | ECU3 | AT2 |
| 3 | EP2 | ECU2 | AT3 | |
| ... | ... | ... | ... | ... |

FIG. 9A

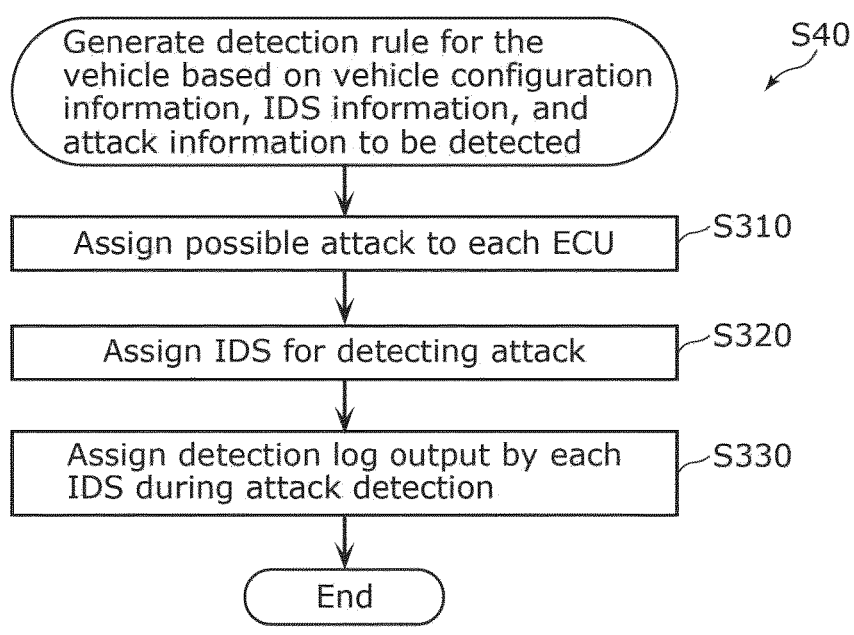

Generate detection rule for the vehicle based on vehicle configuration information, IDS information, and attack information to be detected — S40

Assign possible attack to each ECU — S310

Assign IDS for detecting attack — S320

Assign detection log output by each IDS during attack detection — S330

End

FIG. 9B

Detection rule

| ECU | Detection target attack | Monitoring IDS | Output detection log |
|---|---|---|---|
| EP1 | Port scan | H-IDS1 | Firewall error |
| | Unauthorized device connection | Defense function | Authentication error |
| ECU1 | Unauthorized message insertion | N-IDS1 | MAC error |
| | Unauthorized repro | H-IDS2 | Repro error |
| ... | ... | ... | ... |

FIG. 10A

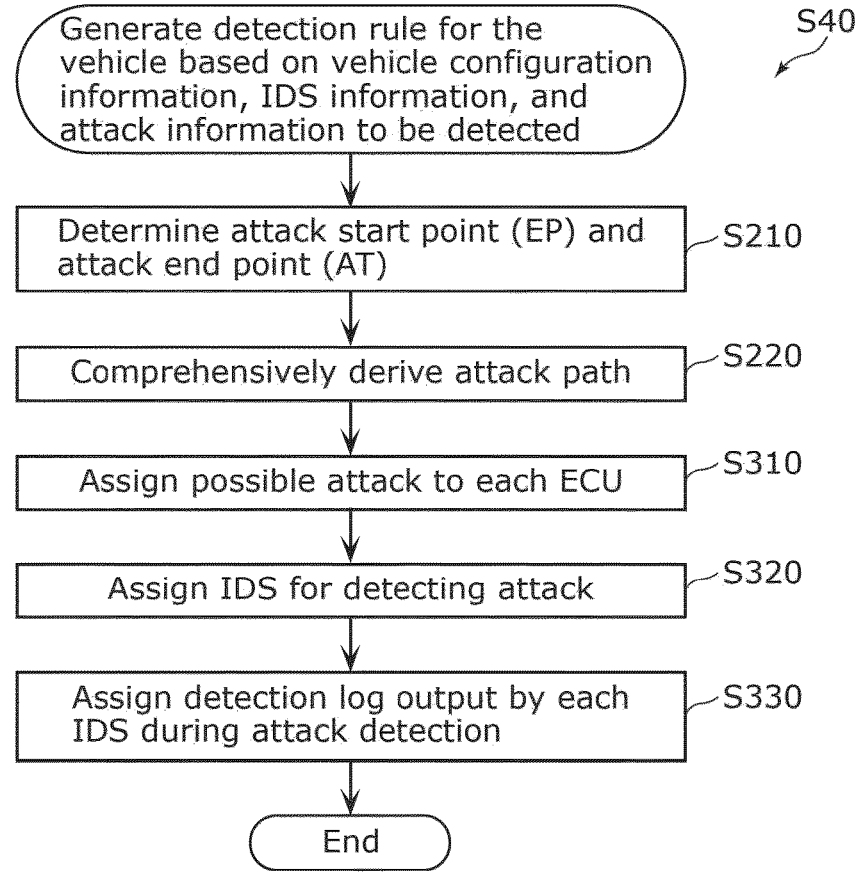

S40

Generate detection rule for the vehicle based on vehicle configuration information, IDS information, and attack information to be detected Determine attack start point (EP) and attack end point (AT) — S210

Comprehensively derive attack path — S220

Assign possible attack to each ECU — S310

Assign IDS for detecting attack — S320

Assign detection log output by each IDS during attack detection — S330

End

FIG. 10B

Detection rule

| No | STEP | STEP1 | STEP2 | STEP3 |
|---|---|---|---|---|
| 1 | ECU | EP1 | ECU3 | AT2 |
| | Detection target attack | Unauthorized device connection | Unauthorized repro | DoS attack |
| | Monitoring IDS | Defense function | H-IDS3 | N-IDS |
| | Output detection log | Authentication error | Repro error | Abnormality in frequency |
| ... | ... | ... | ... | ... |

Figure 16:
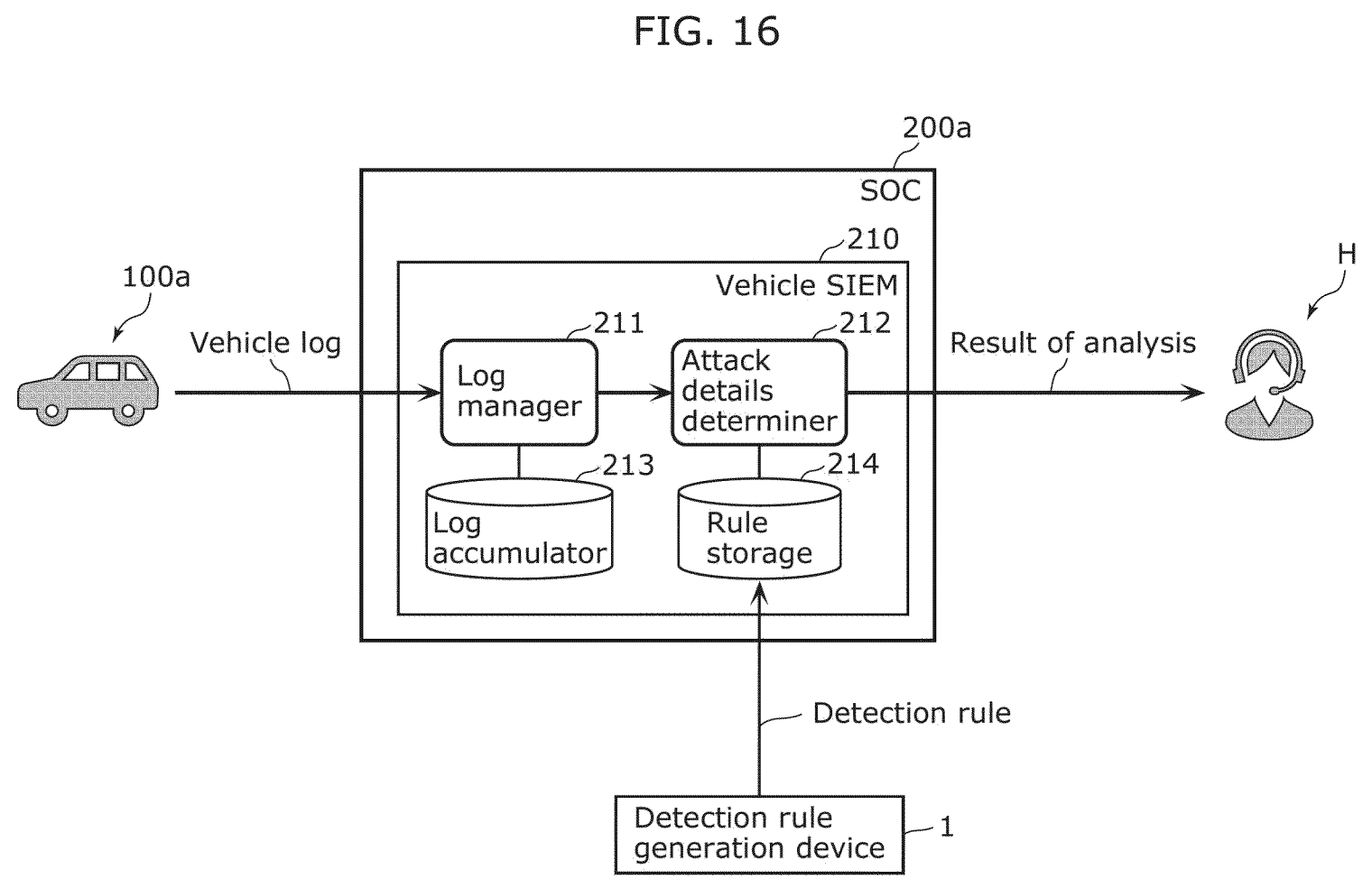

Result of analysis

Vehicle log

H

100a

200a

SOC

Vehicle SIEM    210

Attack details determiner    212

Log manager    211

Log accumulator    213

Rule storage    214

Detection rule

Detection rule generation device    1

DETECTION RULE OUTPUT METHOD, SECURITY SYSTEM, AND DETECTION RULE OUTPUT DEVICE

CROSS REFERENCE TO RELATED APPLICATIONS

This is a continuation application of PCT International Application No. PCT/JP2022/024699 filed on Jun. 21, 2022, designating the United States of America, which is based on and claims priority of Japanese Patent Application No. 2021-134255 filed on Aug. 19, 2021.

FIELD

The present disclosure relates to a detection rule output method, a security system, a security system, and a detection rule output device.

BACKGROUND

In recent years, an automobile (an example of a vehicle) includes a system in which a plurality of devices called electronic control units (hereinafter referred to as "ECUs") are provided. A network that connects these ECUs is called in-vehicle network. As vehicles that include such an in-vehicle network, for example, so-called connected cars are known that are vehicles that have a connection function for connecting with external networks including the Internet and the like. It has been pointed out that the connected cars are exposed to threats in which attackers intrude into their in-vehicle networks from external networks of the vehicles and take unauthorized control on the vehicles. For this reason, studies on security are being conducted.

For example, Patent Literature 1 (PTL 1) discloses a technique that monitors communication traffic data on an in-vehicle communication network (an in-vehicle network) and identifies an abnormality in the communication traffic data that affects vehicle operations.

CITATION LIST

Patent Literature

PTL 1: Japanese Patent No. 6382724

SUMMARY

However, the technique according to PTL 1 can be improved upon.

In view of this, the present disclosure provides a detection rule output method, a security system, and a detection rule output device capable of improving upon the above related art.

A detection rule output method according to an aspect of the present disclosure is a detection rule output method for outputting a detection rule used in a security system that determines attack details based on log information of a vehicle, the detection rule output method including: acquiring vehicle configuration information regarding a configuration of an in-vehicle network provided in the vehicle, intrusion detection system (IDS) information regarding one or more intrusion detection systems (IDSes) mounted in the vehicle, and attack information to be detected regarding an attack on the vehicle to be detected; and outputting, to a storage device included in the security system, the detection rule that is a detection rule for detecting a location in the vehicle where an abnormality has occurred and the abnormality that has occurred in the location, and is generated based on the vehicle configuration information, the IDS information, and the attack information to be detected.

A security system according to an aspect of the present disclosure includes: a storage that stores a detection rule output by using the detection rule output method described above; an acquirer that acquires the log information; and a determiner that determines the attack details of the attack on the vehicle based on the detection rule and the log information.

A detection rule output device according to an aspect of the present disclosure is a detection rule output device that outputs a detection rule used in a security system that determines attack details based on log information of a vehicle, the detection rule output device including: an acquirer that acquires vehicle configuration information regarding a configuration of an in-vehicle network provided in the vehicle, intrusion detection system (IDS) information regarding one or more intrusion detection systems (IDSes) mounted in the vehicle, and attack information to be detected regarding an attack on the vehicle to be detected; and an outputter that outputs, to a storage device included in the security system, the detection rule that is a detection rule for detecting a location in the vehicle where an abnormality has occurred and the abnormality that has occurred in the location, and is generated based on the vehicle configuration information, the IDS information, and the attack information to be detected.

According to one aspect of the present disclosure, a detection rule output method and the like capable of improving upon the above related art can be achieved.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 1 is a block diagram showing a functional configuration of a detection rule generation device according to Embodiment 1.

FIG. 3A is a diagram showing an example of IDS information according to Embodiment 1.

FIG. 3B is a diagram showing an example of an output detection log according to Embodiment 1.

FIG. 4 is a diagram showing an example of attack information to be detected according to Embodiment 1.

FIG. 5 is a diagram illustrating detection rule generation performed by the detection rule generation device according to Embodiment 1.

FIG. 6 is a flowchart illustrating an operation performed by the detection rule generation device according to Embodiment 1.

FIG. 9A is a flowchart illustrating a third example of step S40 shown in FIG. 6 in detail.

FIG. 9B is a diagram showing an example of a detection rule regarding abnormality details.

FIG. 10A is a flowchart illustrating a fourth example of step S40 shown in FIG. 6 in detail.

FIG. 10B is a diagram showing an example of a detection rule regarding attack scenario.

FIG. 15 is a block diagram showing a first example of a functional configuration of an abnormality detection system that uses a detection rule generated by a detection rule generation device according to the present disclosure.

FIG. 16 is a block diagram showing a second example of a functional configuration of an abnormality detection system that uses a detection rule generated by the detection rule generation device according to the present disclosure.

Figures 2A, 2B:
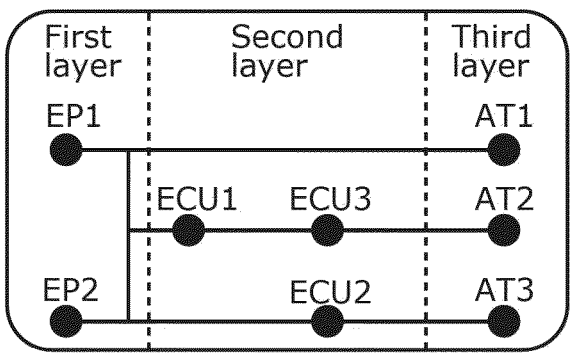
FIG. 2A is a diagram showing an example of vehicle configuration information according to Embodiment 1.
FIG. 2B is a diagram showing an example of information indicating a connection relationship according to Embodiment 1.

DESCRIPTION OF EMBODIMENTS (Underlying Knowledge Forming Basis of the Present Disclosure)

As described in the background section above, the technique disclosed in PTL 1 can be improved upon.

In order to determine an abnormality by using the technique disclosed in PTL 1, rules (detection rules) for defining abnormalities are required. The configurations of the communication traffic data and the in-vehicle network may vary depending on, for example, the vehicle model. Accordingly, there is a demand for outputting detection rules for each vehicle model to an abnormality detection device.

However, a considerable amount of effort is required to generate and output detection rules for each vehicle model, which is not easy to perform. Also, PTL 1 does not disclose outputting detection rules.

In view of the above, the inventors of the present application arrived at a detection rule output method, a security system, and a detection rule output device with which it is possible to easily generate and output detection rules as a further improvement of the detection rule output method and the security system (Circumstances Leading to the Present Disclosure)

Prior to describing the present disclosure, circumstances leading to the present disclosure will be described.

For example, an intrusion detection system (IDS) that monitors events that occur in an in-vehicle network and analyzes the events to detect a reconnaissance activity or a sign of cyberattack such as an unauthorized intrusion is provided in a vehicle. For example, one or more intrusion detection systems (IDSes) are provided in each ECU. In the vehicle, an in-vehicle monitoring device is provided that collects detection logs from a plurality of IDSes and identifies an abnormality that has occurred in the vehicle based on the collected detection logs. The in-vehicle monitoring device does not necessarily need to be mounted in a vehicle, and may be provided in a security operation center (SOC). Hereinafter, an example will be mainly described in which an in-vehicle monitoring device is mounted in a vehicle.

The in-vehicle monitoring device identifies, by using, for example, detection rules in which attack patterns are defined in advance, an attack (comprehensive attack) on the vehicle from among time-series data of collected one or more detection logs. Also, the in-vehicle monitoring device transmits a result of identification or the time-series data to the SOC.

Here, the detection rules vary depending on the configuration of the vehicle (for example, the configuration of the in-vehicle network) and attacks that need to be detected in the vehicle, and the like. Accordingly, it is desirable to generate, for example, detection rules for each vehicle or for each vehicle model. However, it requires a number of steps to generate detection rules for each vehicle or for each vehicle model. Also, knowledge and skills are required to generate detection rules, and it is therefore not easy to generate detection rules. As a matter of fact, generation of detection rules is a problem, for example, during vehicle production based on original equipment manufacturing (OEM).

In other words, it is desirable to output detection rules for each vehicle model, but a considerable amount of effort is required to output detection rules for each vehicle model, which is not easy to perform.

As described above, with conventional technology, it is difficult to easily output detection rules. Also, PTL 1 does not disclose outputting detection rules.

In view of the above, the inventors of the present application conducted in-depth studies on a detection rule output method and the like, with which it is possible to easily output detection rules, and arrived at a detection rule output method and the like described below.

A detection rule output method according to an aspect of the present disclosure is a detection rule output method for outputting a detection rule used in a security system that determines attack details based on log information of a vehicle, the detection rule output method including: acquiring vehicle configuration information regarding a configuration of an in-vehicle network provided in the vehicle, intrusion detection system (IDS) information regarding one or more intrusion detection systems (IDSes) mounted in the vehicle, and attack information to be detected regarding an attack on the vehicle to be detected; and outputting, to a storage device included in the security system, the detection rule that is a detection rule for detecting a location in the vehicle where an abnormality has occurred and the abnormality that has occurred in the location, and is generated based on the vehicle configuration information, the IDS information, and the attack information to be detected.

With this configuration, by simply acquiring the vehicle configuration information, the IDS information, and the attack information to be detected, it is possible to, for example, generate and output a detection rule for the vehicle. Accordingly, with the detection rule output method of the present disclosure, it is possible to easily generate and output a detection rule.

Also, for example, the vehicle configuration information may include: first electronic control unit (ECU) information indicating one or more ECUs mounted in the vehicle; second ECU information regarding an ECU that can be an entry point of the attack on the vehicle and an ECU that can be an attack target among the one or more ECUs; and connection information indicating a connection relationship between the one or more ECUs, and the detection rule may be a detection rule generated based on the first ECU information, the second ECU information, and the connection information, to include a depth of each of the one or more ECUs from the entry point.

With this configuration, in the case where an abnormality is detected in the one or more ECUs, it is possible to easily generate and output a detection rule that can output the depth of the one or more ECUs in which the abnormality has been detected.

Also, for example, the detection rule may be a detection rule generated by: identifying, based on the first ECU information, the second ECU information, and the connection information, a mounting location indicating a position of each of the one or more ECUs in a relative connection relationship between the one or more ECUs from the entry point; and assigning, based on the mounting location identified, the depth when an abnormality occurs in each of the one or more ECUs.

With this configuration, the depth can be assigned to each of the one or more ECUs based on the identified mounting location, and it is therefore possible to easily generate and output a detection rule that can output the depth of the one or more ECUs in which the abnormality has been detected.

Also, for example, the vehicle configuration information may include: first electronic control unit (ECU) information indicating one or more ECUs mounted in the vehicle; second ECU information regarding an ECU that can be an entry point of the attack on the vehicle and an ECU that can be an attack target among the one or more ECUs; and connection information indicating a connection relationship between the one or more ECUs, and the detection rule may be a detection rule generated based on the first ECU information, the second ECU information, and the connection information, to include an attack path including a first ECU and a second ECU, the first ECU being the ECU that can be the entry point as a start point of the attack, the second ECU being the ECU that can be the attack target as an end point of the attack.

With this configuration, it is possible to easily generate and output a detection rule that can output information indicating that there is an abnormality in the vehicle in the case where the order of ECUs in which abnormalities have been detected (attack path) is a predetermined order.

Also, for example, the detection rule may be a detection rule generated by: determining the first ECU and the second ECU based on the second ECU information; and comprehensively deriving, based on the first ECU information and the connection information, the attack path between the first ECU and the second ECU determined.

With this configuration, it is possible to generate and output a detection rule regarding the attack path easily and without missing.

Also, for example, the vehicle configuration information may include first electronic control unit (ECU) information indicating one or more ECUs mounted in the vehicle. The IDS information may include: monitoring IDS information indicating the one or more IDSes that monitor the one or more ECUs mounted in the vehicle; and output detection log information indicating a detection log output when the one or more IDSes detect an abnormality in the one or more ECUs. The detection rule may be a detection rule generated based on the first ECU information, the monitoring IDS information, the output detection log information, and the attack information to be detected, to include abnormality details indicating details of the abnormality that has occurred in the vehicle.

With this configuration, it is possible to easily generate and output a detection rule that can output information indicating that there is an abnormality in the vehicle in the case where the abnormality details of the abnormality detected in the one or more ECUs correspond to predetermined details.

Also, for example, the detection rule may be a detection rule generated by: assigning, based on the first ECU information and the attack information to be detected, a potential attack that possibly occurs on each of the one or more ECUs; assigning, based on the monitoring IDS information, an IDS that detects the attack; and assigning, based on the output detection log information, a detection log output by each of the one or more IDSes when the attack is detected.

With this configuration, it is possible to more easily generate and output a detection rule regarding abnormality details in which the one or more ECUs, the attack on the one or more ECUs, the one or more IDSes that monitor the one or more ECUs, and the detection log are associated.

Also, for example, the vehicle configuration information may include: first electronic control unit (ECU) information indicating one or more ECUs mounted in the vehicle; second ECU information regarding an ECU that can be an entry point of the attack on the vehicle and an ECU that can be an attack target among the one or more ECUs; and connection information indicating a connection relationship between the one or more ECUs. The IDS information may include: monitoring IDS information indicating the one or more IDSes that monitor the one or more ECUs mounted in the vehicle; and output detection log information indicating a detection log output when the one or more IDSes detect an abnormality in the one or more ECUs. The detection rule may be a detection rule generated by: deriving, based on the first ECU information, the second ECU information, and the connection information, an attack path including a first ECU and a second ECU, the first ECU being the ECU that can be the entry point as a start point of the attack, the second ECU being the ECU that can be the attack target as an end point of the attack; deriving, based on the first ECU information, the monitoring IDS information, the output detection log information, and the attack detection target information, abnormality details indicating details of the abnormality that has occurred in the vehicle; and including a scenario of the attack in which the attack path and the abnormality details are combined.

With this configuration, it is possible to easily generate and output a detection rule that can output information indicating that there is an abnormality in the vehicle in the case where the combination (attack scenario) of the attack path of the abnormality detected in the one or more ECUs and the abnormality details corresponds to predetermined details.

Also, for example, the attack path may be an attack path including the first ECU as the start point of the attack and the second ECU as the end point of the attack and comprehensively derived based on the first ECU information, the second ECU information, and the connection information.

The abnormality details may be abnormality details derived by: assigning, based on the first ECU information and the attack information to be detected, a potential attack that possibly occurs on each of a plurality of ECUs that constitute the attack path; assigning, based on the monitoring IDS information, an IDS that detects the attack; and assigning, based on the output detection log information, a detection log output by each of the one or more IDSes when the attack is detected.

With this configuration, it is possible to generate and output a detection rule regarding the attack scenario easily and without missing.

Also, for example, additional information to the rule including additional information on the detection rule may be further added to the detection rule. The detection rule to which the additional information to the rule has been added may be output to the storage device.

With this configuration, the additional information to the rule can be added to the detection rule to be output, and thus, for example, the additional information to the rule can be used to detect an abnormality in the vehicle or the like by using the detection rule. The additional information to the rule can contribute to improving the performance of the in-vehicle monitoring device such as, for example, capable of determining whether a notification of the abnormality is to be made or the like based on the additional information to the rule.

Also, for example, the additional information to the rule may include at least one of detection rule priority, risk value corresponding to a degree of influence, occurrence possibility corresponding to ease of attack associated with one or more ECUs mounted in the vehicle, similarity to a pre-defined attack, or a flag indicating that the detection rule matches the pre-defined attack.

With this configuration, the action performed on the vehicle when an abnormality is detected in the vehicle can be changed depending on whether at least one of the detection rule priority, the risk value, the occurrence possibility, the similarity, or the flag when the abnormality was detected satisfies a predetermined condition. For example, by making a notification of the abnormality when the detection rule priority is greater than or equal to a threshold value, the notification of the abnormality can be effectively transmitted.

Also, for example, a plurality of detection rules may be generated based on the vehicle configuration information, the IDS information, and the attack information to be detected. One or more detection rules may be output to the storage device, the one or more detection rules resulting from narrowing down the plurality of detection rules, based on information for narrowing rules, the information for narrowing the plurality of detection rules down to the one or more detection rules that are to be output to the storage device.

With this configuration, a detection rule to be output can be obtained from narrowing down the plurality of detection rules, and it is therefore possible to suppress the occurrence of a situation in which an abnormality that is unnecessary to be detected is detected.

Also, for example, the information for narrowing rules may include one of: information indicating that at least one of a detection rule including a specific attack path or a detection rule including an unlikely combination of abnormalities is to be excluded; or information indicating that at least one of a detection rule whose degree of influence on the vehicle is a predetermined level or more or a detection rule that matches a pre-defined attack is to be output.

With this configuration, it is possible to output a detection rule in which an abnormality that is unnecessary to be detected has been excluded, or a detection rule including an abnormality that needs to be detected.

Also, for example, the storage device may be provided in at least one of the vehicle or a server included in a security operation center (SOC) that monitors the vehicle.

With this configuration, it is possible to easily generate and output a detection rule used in the vehicle or the SOC.

Also, a security system according to an aspect of the present disclosure includes: a storage that stores a detection rule output by using the detection rule output method described above; an acquirer that acquires the log information; and a determiner that determines the attack details of the attack on the vehicle based on the detection rule and the log information.

With this configuration, it is possible to achieve a security system that uses a detection rule output by using the detection rule output method described above.

Generic or specific aspects of the present disclosure may be implemented by a system, a method, an integrated circuit, a computer program or a computer readable non-transitory recording medium such as a CD-ROM, or may be implemented by any combination of a system, a method, an integrated circuit, a computer program and a recording medium. The program may be stored in advance in the recording medium, or may be supplied to the recording medium via a wide area communication network such as the Internet.

Hereinafter, embodiments will be described specifically with reference to the drawings.

The embodiments described below show generic or specific examples of the present disclosure. The numerical values, shapes, structural elements, the arrangement and connection of the structural elements, steps, the order of the steps, and the like shown in the following embodiments are merely examples, and therefore are not intended to limit the scope of the present disclosure.

Also, the diagrams are schematic representations, and thus are not necessarily true to scale. Accordingly, for example, dimensions and the like are not necessarily the same in the diagrams. Also, in the diagrams, structural elements that are substantially the same are given the same reference numerals, and a redundant description is omitted or simplified.

Also, in the specification of the present application, the terms that describe the relationship between elements such as "equal", numerical values, and numerical value ranges are expressions that not only have a strict meaning but also encompass a substantially equal range, for example, a margin of about several percent (for example, about 10%).

Embodiment 1

Hereinafter, a detection rule generation device and the like according to the present embodiment will be described with reference to FIGS. 1 to 10B.

[1-1. Configuration of Detection Rule Generation Device]

First, a configuration of a detection rule generation device according to the present embodiment will be described with reference to FIGS. 1 to 5. FIG. 1 is a block diagram showing a functional configuration of detection rule generation device 1 according to the present embodiment. Detection rule generation device 1 according to the present embodiment is an information processing device that acquires vehicle configuration information, IDS information, and attack information to be detected, generates detection rules used to detect abnormalities in an in-vehicle monitoring device mounted in a vehicle or the like based on the vehicle configuration information, the IDS information, and the attack information to be detected that were acquired, and outputs the generated detection rules.

As shown in FIG. 1, detection rule generation device 1 includes vehicle configuration information acquirer 10, IDS information acquirer 20, acquirer for attack information to be detected 30, detection rule generator 40, and controller 50. These functional elements of detection rule generation device 1 are implemented by, for example, a processor operating in accordance with a program (computer program) stored in a memory. Detection rule generation device 1 is implemented by, for example, a computer (for example, a server device) that includes a processor, a memory, a communication interface, and the like.

The detection rules according to the present embodiment are detection rules that are used in a security system (see Embodiment 4) that determines the details of an attack on the vehicle based on log information (a detection log or a vehicle log, which will be described later) of the vehicle, and in which, for example, attack paths, abnormality details, and the like are written. For example, the detection rules may be rules for detecting a location in the vehicle where an abnormality has occurred and the abnormality that has occurred in the location.

Vehicle configuration information acquirer 10 acquires vehicle configuration information regarding the configuration of the in-vehicle network provided in the vehicle. The vehicle configuration information includes at least one of: information regarding one or more ECUs mounted in the vehicle (the information being vehicle-mounted ECU information that is an example of first ECU information); information regarding an ECU that can be an entry point (EP) from which a cyberattack intrudes into the in-vehicle network and an ECU that can be an attack target (AT) (the information being an example of second ECU information); or information indicating a connection relationship between the one or more ECUs (the information being connection information). The information indicating the connection relationship may include, for example, information regarding a connection bus. Vehicle configuration information acquirer 10 may store the acquired vehicle configuration information in a storage (not shown).

Vehicle configuration information acquirer 10 may acquire vehicle configuration information from an external device through communication or the like. In this case, vehicle configuration information acquirer 10 includes an antenna and the like, and receives the vehicle configuration information. Also, vehicle configuration information acquirer 10 may include an operation controller such as a button or a touch panel, or a microphone, and receive the vehicle configuration information through user input (operation or voice). Vehicle configuration information acquirer 10 is an example of a first acquirer.

Here, the vehicle configuration information will be described with reference to FIGS. 2A and 2B. FIG. 2A is a diagram showing an example of the vehicle configuration information according to the present embodiment. FIG. 2B is a diagram showing an example of the information (connection information) indicating a connection relationship according to the present embodiment. FIG. 2B shows a connection relationship between two ECUs that can function as EPs (EP 1 and EP 2), three ECUs that can function as ATs (AT 1, AT 2, and AT 3) and three other ECUs (ECU 1, ECU 2, and ECU 3).

As shown in FIG. 2A, the vehicle configuration information includes the following items: vehicle-mounted ECU; EP/AT (an example of ECU information); and "connection relationship". It is sufficient that the vehicle configuration information includes at least one of the following items: "vehicle-mounted ECU"; "EP/AT"; and "connection relationship".

The item "vehicle-mounted ECU" indicates information indicating all ECUs mounted in the vehicle, and includes at least one of ECU identification information or installation location information indicating installation locations (mounting locations) of the ECUs in the vehicle. The ECU identification information is information with which it is possible to identify each individual ECU and that varies from ECU to ECU. The ECU identification information may be production number, serial number, or the like. However, the ECU identification information is not limited thereto. The installation location information is information indicating a relative position of an ECU from an EP, and may be so-called hop count, layer count, or the like. The hop count refers to the number of devices (for example, other ECUs, a gateway, and the like) provided between the EP and the ECU. The layer count refers to the number of layers with an equal security policy provided between the EP and the ECU. Here, the hop count and the layer count may also be referred to as "depth".

The item "EP/AT" includes information for identifying ECUs that can function as an entry point (EP) and an attack target (AT). The ECU information includes, for example, ECU identification information for identifying all ECSs that can function as EPs and ECU identification information for identifying all ECUs that can function as ATs. As an EP, for example, a communication ECU, a diagnostics connector, or the like may be set. Likewise, as an AT, for example, an ECU that has a depth greater than or equal to a predetermined value from the EP may be set. However, the EP and the AT are not limited thereto. All ECUs mounted in the vehicle may be set as ATs. the item "EP/AT" does not necessarily need to be included in the vehicle configuration information.

The item "connection relationship" indicates a connection relationship between the ECUs. The information indicating the connection relationship shows which ECUs are connected to be capable of performing communication.

As shown in FIG. 2B, EP 1, EP 2, ECU 1, ECU 2, ECU 3, AT 1, AT 2, and AT 3 are connected by communication paths (indicated by black lines shown in FIG. 2B). EP 1 and EP 2 are connected directly to, for example, AT 1. EP 1 and EP 2 are also connected to AT 2 via ECU 1 and ECU 3, and also connected to AT 3 via ECU 2. In this way, with this connection relationship, the paths from the EPs to the ATs can be acquired.

The layer count shown in FIG. 2B (a first layer, a second layer, and a third layer) indicate layers that have different security policies. The first layer includes EP 1 and EP 2, the second layer includes ECU 1, ECU 2, and ECU 3, and the third layer includes AT 1, AT 2, and AT 3. For example, the depth of AT 1, AT 2, and AT 3 is 3 (the third layer). Also, for example, the hop count of EP 1 and EP 2 is 1. Taking EP 1 as an example, the hop count of AT 1, ECU 1, and ECU 2 is 2, the hop count of ECU 3 and AT 3 is 3, and the hop count of AT 2 is 4.

Referring again back to FIG. 1, IDS information acquirer 20 acquires IDS information regarding IDSes mounted in the vehicle. The IDS information includes: information (monitoring IDS information) regarding one or more IDSes that monitor the one or more ECUs mounted in the vehicle; an output detection log (output detection log information)

indicating a detection log that is output when the one or more IDSes detect an abnormality in the one or more ECUs; and the like. IDS information acquirer 20 may store the acquired IDS information in a storage.

IDS information acquirer 20 may acquire the IDS information from an external device through communication. In this case, IDS information acquirer 20 includes an antenna and the like, and receives the IDS information. Also, IDS information acquirer 20 may include an operation controller such as a button or a touch panel, or a microphone, and receive the IDS information through user input (operation or voice). IDS information acquirer 20 is an example of a second acquirer.

Here, the IDS information will be described with reference to FIGS. 3A and 3B. FIG. 3A is a diagram showing an example of the IDS information according to the present embodiment. FIG. 3B is a diagram showing an example of the output detection log (output detection log information) according to the present embodiment.

As shown in FIG. 3A, the IDS information includes the following items: monitoring IDS; and output detection log. It is sufficient that the IDS information includes at least one of the following items: "monitoring IDS"; and "output detection log".

The item "monitoring IDS" includes information regarding one or more IDSes that monitor the one or more ECUs or communication buses. The item "monitoring IDS" includes: information indicating which IDS monitors which ECU or communication bus; IDS identification information; and the like. The item "output detection log" includes a detection log that is output when the one or more IDSes detect an abnormality in the one or more ECUs or communication buses.

Hereinafter, an example will be described in which item "monitoring IDS" includes information regarding IDSes (so-called host-type IDSes) that monitor the one or more ECUs. However, the item "monitoring IDS" may include information regarding IDSes (so-called network-type IDSes) that monitor the one or more communication buses.

As shown in FIG. 3B, in the output detection log, information included in the item "detection log" is associated with information included in the item "attack details". It can also be said that the output detection log shows a correspondence relationship between the information included in the item "detection log" and the information included in the item "attack details". The item "detection log" indicates information that is output from the one or more IDSes when the one or more IDSes detect an abnormality in the one or more ECUs. The item "attack details" indicates information indicating details of an attack on the one or more ECUs corresponding to the abnormality. For example, if an authentication error is detected in one of the one or more ECUS, "unauthorized device connection" is written in the item "attack details" for the ECU. If a reprogramming (repro) error is detected in one of the one or more ECUs, "unauthorized repro" is written in the item "attack details" for the ECU. If an abnormality in frequency is detected in one of the one or more ECUs, "DOS attack" is written in the item "attack details" for the ECU.

Referring again back to FIG. 1, acquirer for attack information to be detected 30 acquires attack information to be detected regarding attacks that need to be detected in the vehicle. Acquirer for attack information to be detected 30 may store the acquired attack information to be detected in a storage. Acquirer for attack information to be detected 30 is an example of a third acquirer.

Here, the attack information to be detected will be described with reference to FIG. 4. FIG. 4 is a diagram showing an example of the attack information to be detected according to the present embodiment.

As shown in FIG. 4, the attack information to be detected includes an item "detection target attack". The item "detection target attack" includes information regarding attacks that need to be detected in the vehicle. The item "detection target attack" may include, for example, known attacks, attacks corresponding to those defined in Common Attack Pattern Enumeration and Classification (CAPEC), and the like. For example, the item "detection target attack" includes "unauthorized device connection", "unauthorized repro", "DOS attack", and the like. In other words, "unauthorized device connection", "unauthorized repro", and "DOS attack" are attacks that need to be detected in the vehicle. The information in the item "detection target attack" may be written independently or in time-series order. For example, taking an attack "malware download" and an attack "malware execution" that are expected to be performed in this order as an example, each of "malware download" and "malware execution" may be written in the item "detection target attack" as an individual attack (an example of the case where the attacks are written independently). Alternatively, "malware download" and "malware execution" may be written unitarily in the item "detection target attack" as one attack (a series of attacks) such as "malware download-→malware execution" (an example of the case where the attacks are written in a time-series order). Also, the attack information to be detected may include information in which a detection target attack is associated with an ECU (for example, the type of ECU, model number, or the like) in which the detection target attack can be detected.

The attack information to be detected may vary from vehicle to vehicle or from vehicle model to vehicle model, or may be common thereto.

Vehicle configuration information acquirer 10, IDS information acquirer 20, and acquirer for attack information to be detected 30 may be implemented by a single acquiring device, or may be implemented by different acquiring devices.

Referring again back to FIG. 1, detection rule generation device 1 generates a detection rule for detecting an abnormality in the vehicle based on the vehicle configuration information, the IDS information, and the attack information to be detected acquired by vehicle configuration information acquirer 10, IDS information acquirer 20, and acquirer for attack information to be detected 30, respectively. Detection rule generator 40 includes attack path generator 41 and detection target attack associator 42. Detection rule generator 40 also functions as an outputter that outputs the generated detection rule.

Attack path generator 41 generates an attack path extending from an EP as a start point to an AT as an end point based on the vehicle configuration information. Attack path generator 41 determines, based on the information in the item "EP/AT" of the vehicle configuration information, an ECU (an example of a first ECU) that can function as the EP and an ECU (an example of a second ECU) that can function as the AT from among all ECUs mounted in the vehicle. Then, based on the information in the items "vehicle-mounted ECU" and "connection relationship", attack path generator 41 generates an attack path extending from the EP as the start point to the AT as the end point. Attack path generator 41 generates, for example, all possible attack paths (a plurality of attack paths) as the attack path.

In the case where the vehicle configuration information does not include AT information in the item "EP/AT", attack path generator 41 may extract an ECU that can function as an AT from among all ECUs mounted in the vehicle. Attack path generator 41 may extract, for example, based on the ECU that can function as the EP and the connection relationship, an ECU whose depth from the EP is greater than or equal to a predetermined value, as the AT. Attack path generator 41 may extract each of all ECUs mounted in the vehicle as the AT.

Detection target attack associator 42 associates an attack path with a detection target attack based on the IDS information and the attack information to be detected. Detection target attack associator 42 associates, for example, each of ECUs included in an attack path with a detection target attack corresponding to the ECU.

Here, detection rule generation performed by detection rule generation device 1 will be described with reference to FIG. 5. FIG. 5 is a diagram illustrating the detection rule generation performed by detection rule generation device 1 according to the present embodiment.

As shown in FIG. 5, the detection rule includes "Lv. 1: degree of progress of attack", "Lv. 2: attack path", "Lv. 2: abnormality details", and "Lv. 3: "attack scenario". Detection rule generation device 1 generates at least one of a detection rule regarding the degree of progress of attack, a detection rule regarding the attack path, a detection rule regarding the abnormality details, or a detection rule regarding the attack scenario. Lv. (level) indicates the amount of information included in the detection rule. The higher the value of Lv., the more information contained in the detection rule. That is, the higher the value of Lv., the more detailed the detected attack details. Also, each of the detection rule regarding the degree of progress of attack, the detection rule regarding the attack path, the detection rule regarding the abnormality details, and the detection rule regarding the attack scenario is an example of a detection rule for detecting a location in the vehicle where an abnormality has occurred and the abnormality that has occurred in the location.

The detection rule regarding the degree of progress of attack includes depth (hop count) from entry point (EP), layer count (a first layer, a second layer, and the like), and the like. In order to generate the detection rule regarding the degree of progress of attack, the information in at least one of the following items: "vehicle-mounted ECU", "EP/AT", and "connection relationship" is used as input information. Also, in order to generate the detection rule regarding the degree of progress of attack, at least one of the IDS information or the attack information to be detected may also be used as the input information.

Detection rule generation device 1 generates the detection rule regarding the degree of progress of attack (see FIGS. 7B and 7C, which will be described later) based on the attack paths generated by attack path generator 41.

The detection rule regarding the attack path includes a path extending from an entry point (EP) as a start point to an attack target (AT) as an end point, derived based on the connection relationship between the ECUs. In order to generate the detection rule regarding the attack path, the information in at least one of the following items: "vehicle-mounted ECU", "EP/AT", and "connection relationship" is used as input information. Also, in order to generate the detection rule regarding the attack path, at least one of the IDS information or the attack information to be detected may also be used as the input information.

Detection rule generation device 1 generates the detection rule regarding the attack path (see FIG. 8B, which will be described later) based on the attack paths generated by attack path generator 41.

The detection rule regarding the abnormality details includes abnormality details detected in the one or more ECUs and a detection log that is output when the abnormality details is detected. In order to generate the detection rule regarding the abnormality details, the information in at least one of the following items: "vehicle-mounted ECU", "monitoring IDS", "output detection log", and "detection target attack" is used as input information.

Detection rule generation device 1 generates the detection rule regarding the abnormality details (see FIG. 9B, which will be described later) based on the information described above.

The detection rule regarding the attack scenario includes a scenario (a combination of an attack path and abnormality details) that represents a sequence of abnormalities in the one or more ECUs based on the attack paths. In order to generate the detection rule regarding the attack scenario, the information in at least one of the following items: "vehicle-mounted ECU", "EP/AT", "connection relationship", "monitoring IDS", "output detection log", and "detection target attack" is used as input information.

Detection rule generation device 1 generates the detection rule regarding the attack scenario (see FIG. 10B, which will be described later) based on the information described above.

As described above, detection rule generation device 1 according to the present embodiment includes: for example, vehicle configuration information acquirer 10 (an example of a first acquirer) that acquires vehicle configuration information regarding a configuration of an in-vehicle network provided in a vehicle; IDS information acquirer 20 (an example of a second acquirer) that acquires IDS information regarding IDSes mounted in the vehicle; acquirer for attack information to be detected 30 (an example of a third acquirer) that acquires attack information to be detected indicating attacks that need to be detected in the vehicle; detection rule generator 40 (an example of a generator) that generates a detection rule for detecting an abnormality in the vehicle based on the vehicle configuration information, the IDS information, and the attack information to be detected; and detection rule generator 40 (an example of an outputter) that outputs the generated detection rule.

[1-2. Operation of Detection Rule Generation Device]

Next, an operation performed by detection rule generation device 1 configured as described above will be described with reference to FIGS. 6 to 10B. FIG. 6 is a flowchart illustrating an operation (a detection rule generation method) performed by detection rule generation device 1 according to the present embodiment. The detection rule generation method is an example of an information processing method.

As shown in FIG. 6, detection rule generation device 1 acquires vehicle configuration information via vehicle configuration information acquirer 10 (S10). The vehicle configuration information is acquired at a timing when, for example, an in-vehicle network is generated, when the in-vehicle network is changed, or the like. However, the timing is not limited thereto. Step S10 is an example of a first acquiring step.

Next, detection rule generation device 1 acquires IDS information via IDS information acquirer 20 (S20). The IDS information is acquired at a timing when, for example, an in-vehicle network is generated, or when one of the IDSes mounted in the vehicle is changed. However, the timing is not limited thereto. Step S20 is an example of a second acquiring step.

Next, detection rule generation device 1 acquires attack information to be detected via acquirer for attack information to be detected 30 (S30). The attack information to be detected is acquired at a timing when, for example, a detection target attack is generated, or when the detection target attack is changed. However, the timing is not limited thereto. Step S30 is an example of a third acquiring step.

There is no particular limitation on the order in which the vehicle configuration information, the IDS information, and the attack information to be detected are acquired.

Next, detection rule generation device 1 generates a detection rule for the vehicle based on the vehicle configuration information, the IDS information, and the attack information to be detected acquired in steps S10 to S30, respectively (S40). Details of step S40 will be described later. Step S40 is an example of a generation step. There is no particular limitation on the number of detection rules generated in step S40. For example, the number of detection rules generated in step S40 may be one or more.

Next, detection rule generation device 1 outputs the generated detection rule (S50). Detection rule generation device 1 outputs the detection rule to, for example, the vehicle or the in-vehicle monitoring device provided in the SOC through communication. It can also be said that detection rule generation device 1 outputs the generated detection rule to a storage device included in a security system, which will be described later. With this configuration, detection rule generation device 1 can cause the in-vehicle monitoring device to store or update the detection rule for the vehicle. Step S50 is an example of an output step.

Figures 7A, 7B, 7C:
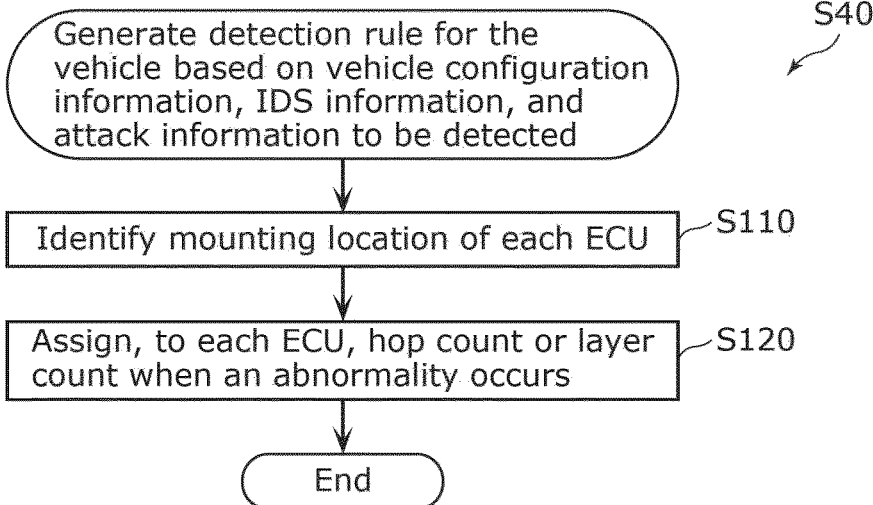
FIG. 7A is a flowchart illustrating a first example of step S40 shown in FIG. 6 in detail.
FIG. 7B is a diagram showing an example of a detection rule regarding the degree of progress of attack.
FIG. 7C is a diagram showing another example of a detection rule regarding the degree of progress of attack.

Next, a first example of step S40 shown in FIG. 6 will be described with reference to FIGS. 7A to 7C. FIG. 7A is a flowchart illustrating the first example of step S40 shown in FIG. 6 in detail. FIG. 7B is a diagram showing an example of the detection rule regarding the degree of progress of attack. FIG. 7C is a diagram showing another example of the detection rule regarding the degree of progress of attack.

As shown in FIG. 7A, in step S40, first, detection rule generator 40 identifies a mounting location of each of the one or more ECUs based on the vehicle configuration information (S110). Detection rule generator 40 identifies a mounting location of each of the one or more ECUs in the architecture based on the vehicle configuration information. For example, detection rule generator 40 identifies, based on the information in the item "vehicle-mounted ECU", the ECU information, and the information in the item "connection relationship", the mounting location of each of the one or more ECUs that indicates a relative positional relationship from the EP. As used herein, the term "mounting location" means, for example, a position of each of the one or more ECUs in a relative connection relationship from the EP. The mounting locations of the one or more ECUs may be included in the vehicle configuration information in advance. The term "mounting location" indicates, for example, a position of each of the one or more ECUs from the EP.

Next, detection rule generator 40 assigns, to each ECU, the hop count or the layer count when an abnormality occurs based on the identified mounting location (S120). Detection rule generator 40 assigns the hop count or the layer count from the EP as the hop count or the layer count of the ECU. It can also be said that detection rule generator 40 assigns, to each of the one or more ECUS, the depth when an abnormality occurs based on the identified mounting location.

As shown in FIG. 7B, detection rule generator 40 may generate, for each ECU, a detection rule to which the hop count is assigned.

With this configuration, in the case where, for example, an abnormality is detected in ECU 3, detection rule generation device 1 can generate a detection rule that can cause "3" that is the hop count of ECU 3 to be output to the in-vehicle monitoring device. That is, the detection rule can cause information indicating how many ECUs from the EP in the connection relationship have been intruded to be output to the in-vehicle monitoring device.

As shown in FIG. 7C, detection rule generator 40 may generate, for each ECU, a detection rule to which the layer count is assigned.

As described above, in step S40, detection rule generator 40 generates, based on the information in the item "vehicle-mounted ECU" information, the ECU information, and the information in the item "connection relationship", a detection rule that includes a depth of each of the one or more ECUs in relation to the EP.

With this configuration, in the case where, for example, an abnormality is detected in ECU 3, detection rule generation device 1 can generate a detection rule regarding the degree of progress of attack that can cause "2" that is the layer count of ECU 3 to be output to the in-vehicle monitoring device. That is, the detection rule can cause information indicating to which layer (to which security policy) intrusion has been extended to be output to the in-vehicle monitoring device.

Figures 8A, 8B:
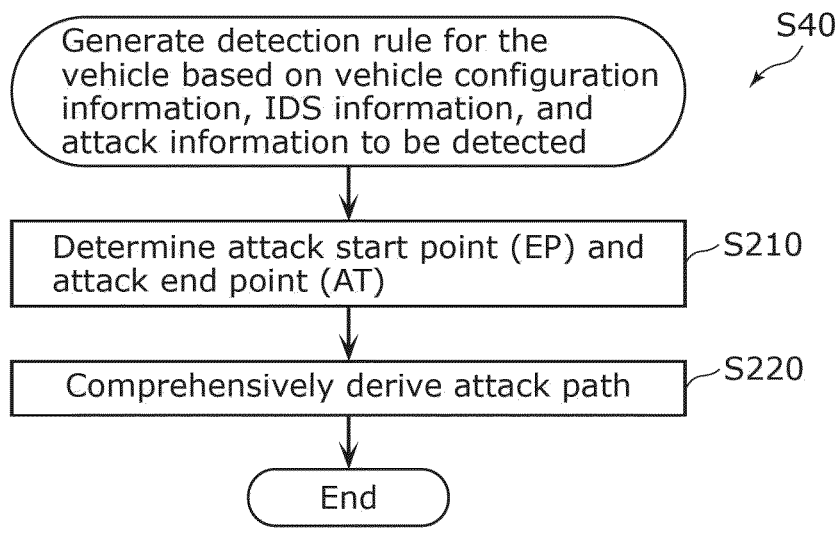
FIG. 8A is a flowchart illustrating a second example of step S40 shown in FIG. 6 in detail.
FIG. 8B is a diagram showing an example of a detection rule regarding an attack path.

Next, a second sample of step S40 shown in FIG. 6 will be described with reference to FIGS. 8A and 8B. FIG. 8A is a flowchart illustrating the second example of step S40 shown in FIG. 6 in detail. FIG. 8B is a diagram showing an example of the detection rule regarding the attack path. In FIG. 8B, three attack paths (three detection rules) including attack paths No. 1, No. 2, and No. 3 are shown. Also, in FIG. 8B, the ECUs from the EP to the AT are referred to as "attack steps", and are indicated by "STEP number". It is assumed that an attack proceeds in ascending order of the STEP number.

As shown in FIG. 8A, in step S40, first, attack path generator 41 of detection rule generator 40 determines, based on the information in the item "EP/AT" of the vehicle configuration information, an attack start point (EP) and an attack end point (AT) (S210). Attack path generator 41 determines one of the EPs listed in the item "EP/AT" of the vehicle configuration information as the EP determined in step S210, and then determines one of the ATs listed in the item "EP/AT" of the vehicle configuration information as the AT determined in step S210. In step S210, attack path generator 41 may determine all ECUs listed in the item "vehicle-mounted ECU" of the vehicle configuration information as ATs.

Next, attack path generator 41 comprehensively derives an attack path (S220). Attack path generator 41 comprehensively derives, based on the information in the item "vehicle-mounted ECU" and the information in the item "connection relationship", a path between the EP and the AT that were determined. Attack path generator 41 derives all paths including one or more ECUs from the EP to the AT.

As shown in FIG. 8B, detection rule generator 40 may generate, for each attack path, a detection rule in which the items "STEP number" and "ECU" are associated. Attack path No. 1 indicates a path along which an attack may proceed from EP 1 to AT 1 in this order. Attack path No. 2 indicates a path along which an attack may proceed from EP 1, ECU 1, ECU 3, and AT 2 in this order. Attack path No. 3 indicates a path along which an attack may proceed from EP 2, ECU 2, and AT 3 in this order.

It can also be said that FIG. 8B shows time-series data of ECUs in which an abnormality is detected.

As described above, in step S40, detection rule generator 40 generates, based on the information in the item "vehicle-mounted ECU", the ECU information, and the information in the item "connection relationship", a detection rule that includes an attack path extending from a first ECU that can be the EP as the attack start point to a second ECU that can be the AT as the attack end point.

With this configuration, in the case where, for example, an attack occurs on a predetermined path, detection rule generation device 1 can generate a detection rule regarding abnormality details that can cause information indicating the abnormality to be output to the in-vehicle monitoring device.

A plurality of attack paths may be generated for each pair of an EP and an AT. Taking attack path No. 2 as an example, an attack path including EP 1, ECU 1, ECU 3, ECU 1, ECU 3, and AT 2 in this order may be generated. That is, the attack path may have a portion (return portion) where an attack proceeds in a direction opposite to the direction from the EP to the AT. It is also possible to generate an attack path in which one ECU is attacked sequentially a plurality of times.

Next, a third example of step S40 shown in FIG. 6 will be described with reference to FIGS. 9A and 9B. FIG. 9A is a flowchart illustrating the third example of step S40 shown in FIG. 6 in detail. FIG. 9B is a diagram showing an example of the detection rule regarding abnormality details. In FIG. 9B, the items "ECU", "detection target attack", "monitoring IDS", and "output detection log" are associated with each other.

As shown in FIG. 9A, in step S40, first, detection target attack associator 42 of detection rule generator 40 assigns, based on the information in the item "vehicle-mounted ECU" and the attack information to be detected, a potential attack (attack details) that possibly occurs in each of the one or more ECUs (S310). In the case where the attack information to be detected includes information in which a detection target attack is associated with an ECU in which the detection target attack may be detected, detection target attack associator 42 assigns, to each of the one or more ECUs listed in the item "vehicle-mounted ECU", an attack that may be detected in the ECU, by using the information. There is no particular limitation on the number of attacks assigned to each ECU, and the number of attacks assigned to each ECU may be one, two, or more.

FIG. 9B shows an example in which attacks "port scan" and "unauthorized device connection" are assigned to the ECU that is EP 1, and attacks "unauthorized message insertion" and "unauthorized repro" are assigned to ECU 1.

Next, detection target attack associator 42 assigns IDSes that detect the attacks based on the IDSes listed in the item "monitoring IDS" of the IDS information (S320). Detection target attack associator 42 identifies IDSes that can detect the attacks assigned to the ECU in step S310 from among the plurality of IDSes mounted in the vehicle based on the IDSes listed in the item "monitoring IDS", and assigns the identified IDSes as IDSes that detect the attacks assigned to the ECU.

FIG. 9B shows an example in which an IDS named "H-IDS 1" is assigned to the attack "port scan", and an IDS named "defense function" is assigned to the attack "unauthorized device connection", likewise, an IDS named "N-IDS 1" is assigned to the attack "unauthorized message insertion", and an IDS named "H-IDS 2" is assigned to the attack "unauthorized repro". The IDS named "H-IDS 1" is an IDS that can detect the attack "port scan" in the ECU. The IDS named "defense function" is an IDS that can detect the attack "unauthorized device connection" in the ECU. Likewise, the IDS named "N-IDS 1" is an IDS that can detect the attack "unauthorized message insertion" in the ECU, and the IDS named "H-IDS 2" is an IDS that can detect the attack "unauthorized repro" in the ECU. The IDSes and the detectable attacks are included in the IDS information.

Next, detection target attack associator 42 assigns a detection log that is output by each IDS when an attack is detected based on the information included in the item "output detection log" of the IDS information (S330).

FIG. 9B shows an example in which "firewall error" is assigned to the IDS named "H-IDS 1", "authentication error" is assigned to the IDS named "defense function", "MAC error" is assigned to the IDS named "N-IDS 1", and "repro error" is assigned to the IDS named "H-IDS 2".

As described above, in step S40, detection rule generator 40 generates, based on the vehicle-mounted ECU information, the monitoring IDS information, the output detection log information, and the attack information to be detected, a detection rule that includes abnormality details indicating the details of abnormalities in the vehicle.

With this configuration, detection rule generation device 1 can generate, for example, when a predetermined abnormality is detected, a detection rule regarding abnormality details that can cause information indicating the abnormality to be output to the in-vehicle monitoring device.

Next, a fourth example of step S40 shown in FIG. 6 will be described with reference to FIGS. 10A and 10B. FIG. 10A is a flowchart illustrating the fourth example of step S40 shown in FIG. 6 in detail. FIG. 10B is a diagram showing an example of the detection rule regarding attack scenario.

As shown in FIG. 10A, the detection rule generation method includes the flowchart shown in FIG. 8A and the flowchart shown in FIG. 9A. In this example, in step S310, an attack is assigned to each of the one or more ECUs included the attack path generated in step S210 from among the plurality of ECUs mounted in the vehicle. With this configuration, it is unnecessary to, for example, assign an attack to each of all ECUs mounted in the vehicle (for example, all ECUs included in the ECUs listed in the item "vehicle-mounted ECU" of the vehicle configuration information). For example, the processing in steps S310 to S330 is executed for each of the one or more ECUS included in the attack path.

Steps S210 and S220 are an example of a first generation step. For example, through the first generation step, attack paths (information indicating attack paths) shown in FIG. 8B are generated. Also, steps S310 to S330 are an example of a second generation step. For example, through the second generation step, abnormality details (information indicating abnormality details) shown in FIG. 9B is generated.

Also, a detection rule that includes an attack scenario in which the attack path and the abnormality details generated in the above-described steps are combined is generated. The generation of the detection rule is an example of a third generation step.

As shown in FIG. 10B, in the detection rule, the items "STEP number", "ECU", "detection target attack", "monitoring IDS", and "output detection log" are associated. The detection rule shown in FIG. 10B shows a detection rule of an attack scenario in the case where the attack path includes EP 1, ECU 3, and AT 2.

Detection target attack associator 42 extracts, for example, the detection target attacks, the monitoring IDSes, and the output detection logs of EP 1 from the information shown in FIG. 9B. In the example shown in FIG. 10B, information that includes "unauthorized device connection" as the detection attack target, "defense function" as the monitoring IDS, and "authentication error" as the output detection log is associated with EP 1. This processing is an example of combining the attack path with the abnormality details.

In the foregoing description, an example was described in which the detection target attack corresponding to EP 1 is "unauthorized device connection". However, the present disclosure is not limited thereto. For example, in the case where a plurality of attacks (detection target attacks) are assigned to EP 1, from among the plurality of abnormality details, information that includes attacks (detection target attacks) included in the attack information to be detected may be extracted, and the extracted information may be associated with EP 1. Here, the information refers to, for example, information in which the items "detection target attack", "monitoring IDS", and "output detection log" are associated.

It can also be said that the detection rule shown in FIG. 10B shows time-series data of a set of the items "ECU", "detection target attack", "monitoring IDS", and "output detection log".

With this configuration, in the case where, for example, predetermined abnormalities are detected in a predetermined order, detection rule generation device 1 can generate a detection rule that can cause information indicating the abnormalities to be output to the in-vehicle monitoring device.

In the case where the detection rule is used in the vehicle, the above-described processing is executed to generate or update the detection rule when, for example, the vehicle is produced, when the vehicle model of the vehicle in which the detection rule is installed is changed, or when a new attack or a new abnormality occurs. Alternatively, in the case where the detection rule is used in the SOC, the above-described processing is executed to generate or update the detection rule when, for example, a new attack occurs, or when the viewpoint of the detection rule is changed.

According to the detection rule generation method described above, for example, even without knowledge and skills for generating detection rules, it is possible to make a detection rule by simply generating vehicle configuration information, IDS information, and attack information to be detected.

In the foregoing description, an example was described in which detection rule generation device 1 executes step S40 shown in FIG. 6 (generation step). However, the present disclosure is not limited thereto. The detection rule does not necessarily need to be generated. Step S40 may be executed by another device, and detection rule generation device 1 may acquire the generated detection rule. In this case, detection rule generation device 1 may output, to the other device, vehicle configuration information, IDS information, and attack information to be detected.

The operation (detection rule output method) performed by detection rule generation device 1 may include executing steps S10 to S30 and step S50 shown in FIG. 6. For example, the detection rule output method includes: acquiring vehicle configuration information, IDS information, and attack information to be detected; and outputting, to a storage device included in a security system, a detection rule for detecting a location in a vehicle where an abnormality has occurred and the abnormality that has occurred in the location, the detection rule being generated based on the vehicle configuration information, the IDS information, and the attack information to be detected that were acquired. In this case, detection rule generation device 1 does not necessarily need to include detection rule generator 40, and it can also be said that detection rule generation device 1 is a detection rule output device.

Embodiment 2

Hereinafter, a detection rule generation device and the like according to the present embodiment will be described with reference to FIGS. 11 and 12. In the following description, differences from Embodiment 1 will be mainly described, and a description of details that are the same as or similar to those of Embodiment 1 may be omitted or simplified.

[2-1. Configuration of Detection Rule Generation Device]

First, a configuration of the detection rule generation device according to the present embodiment will be described with reference to FIG. 11. FIG. 11 is a block diagram showing a functional configuration of detection rule generation device 1a according to the present embodiment. Detection rule generation device 1a according to the present embodiment is different from detection rule generation device 1 according to Embodiment 1 in that detection rule generation device 1a includes acquirer for additional information to the rule 60 and provider for additional information to the rule 43.

Figure 11:
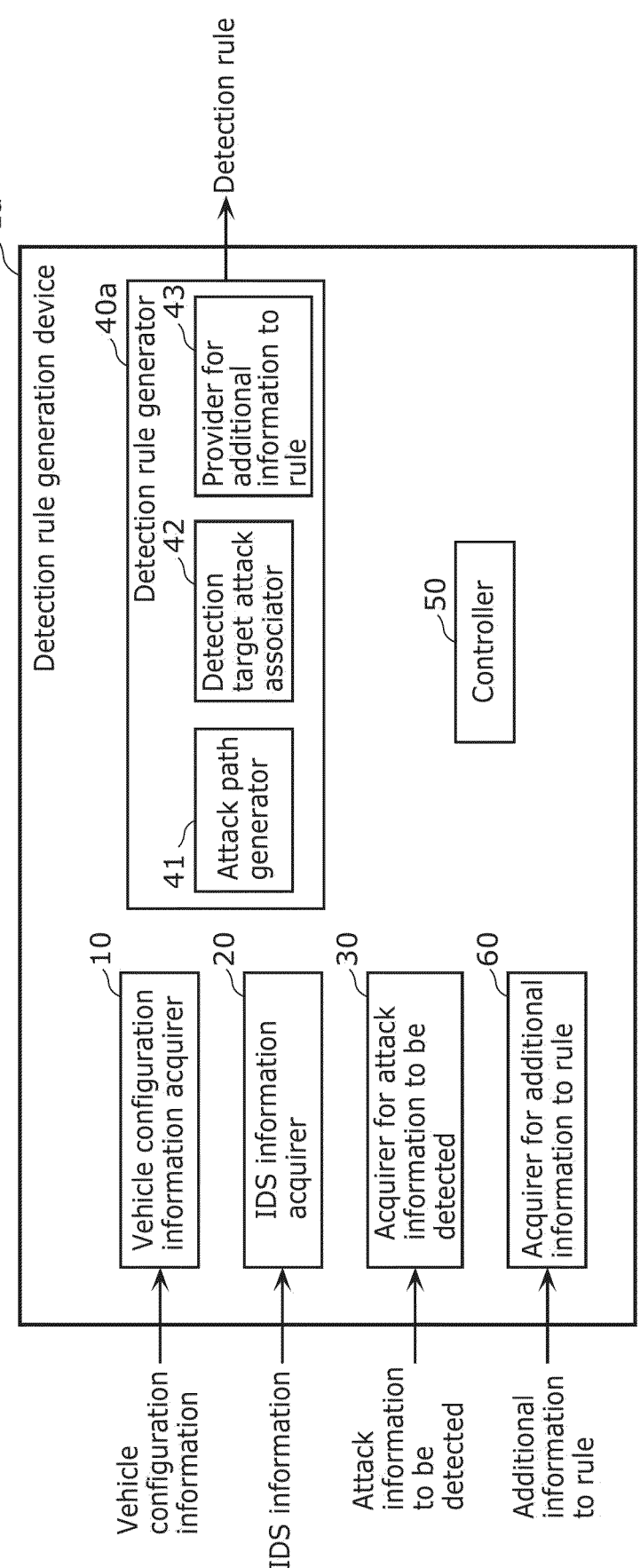
FIG. 11 is a block diagram showing a functional configuration of a detection rule generation device according to Embodiment 2.

As shown in FIG. 11, detection rule generation device 1a includes, in addition to the structural elements of detection rule generation device 1 according to Embodiment 1, acquirer for additional information to the rule 60, and also includes detection rule generator 40a in place of detection rule generator 40. Detection rule generator 40a includes, in addition to the structural elements of detection rule generator 40 according to Embodiment 1, provider for additional information to the rule 43.

Acquirer for additional information to the rule 60 acquires additional information to the rule that is to be added to a detection rule generated by at least one of attack path generator 41 or detection target attack associator 42. Acquirer for additional information to the rule 60 may receive the additional information to the rule through communication or the like, or may receive the additional information to the rule by user input.

The additional information to the rule is information used to perform control on the in-vehicle monitoring device, and is used to, for example, when an abnormality occurs in the vehicle, determine whether to transmit information indicating the abnormality to the SOC. The additional information to the rule may include additional information to be added to the generated detection rule, and may also include, for example, information in which the features of the detection rule are quantified. As the information in which the features of the detection rule are quantified, for example, at least one of priority, risk value, occurrence possibility, similarity, or flag (1 or 0) may be included. For example, for each detection rule, at least one of priority, risk value, occurrence possibility, similarity, or flag (1 or 0) may be added.

The priority indicates information indicating a priority level of abnormality to be detected. For example, a higher priority level is assigned to a detection rule that includes a specific attack path or specific abnormality details.

The risk value indicates information indicating a risk level of abnormalities to be detected. For example, a risk level is assigned to each detection rule according to a degree of influence on a motion of the vehicle associated with each abnormality details. For example, a higher risk value is assigned to a detection rule that has a higher degree of influence.

The occurrence possibility is assigned to each detection rule according to ease of attack associated with each of the one or more ECUs. The ease of attack indicates information indicating how easily the ECU is attacked, and is set in advance according to, for example, the depth of the ECU, the security level of the ECU, or the like.

The similarity indicates information including known attacks and indicating a degree of match with respect to the pre-defined attacks. For example, a higher value is set to the similarity as the degree of match is higher. As the degree of match, for example, the number of items matched including "ECU", "detection target attack", "monitoring IDS", and "output detection log", the ratio of the items, or the like may be used.

The flag is information that indicates that the detection rule satisfies a predetermined condition. For example, the predetermined condition means, but is not limited thereto, having an attack scenario that matches the pre-defined attacks including known attacks.

The priority, the risk value, and the occurrence possibility are assigned to each of the ECUs included in the attack path. The priority, the risk value, and the occurrence possibility of the detection rule may be a statistical value of values assigned to the ECUs. The statistical value may be, for example, any one of Total value, mean value, median value, mode, maximum value, or minimum value, but is not limited thereto. Also, for example, the priority, the risk value, and the occurrence possibility of the detection rule may be a value obtained by performing weighted addition on the values assigned to the ECUs.

Acquirer for additional information to the rule 60 may store the acquired additional information to the rule in a storage (not shown).

Provider for additional information to the rule 43 adds the additional information to the rule described above to the detection rule generated by at least one of attack path generator 41 or detection target attack associator 42. Provider for additional information to the rule 43 may add the additional information to the rule to, for example, each of the plurality of ECUs included in the detection rule.

[2-2. Operation of Detection Rule Generation Device]

Next, an operation performed by detection rule generation device 1a configured as described above will be described with reference to FIG. 12. FIG. 12 is a flowchart illustrating an operation (a detection rule generation method) performed by detection rule generation device 1a according to the present embodiment. The flowchart shown in FIG. 12 includes step S60 in addition to the steps included in the flowchart shown in FIG. 6.

Figure 12:
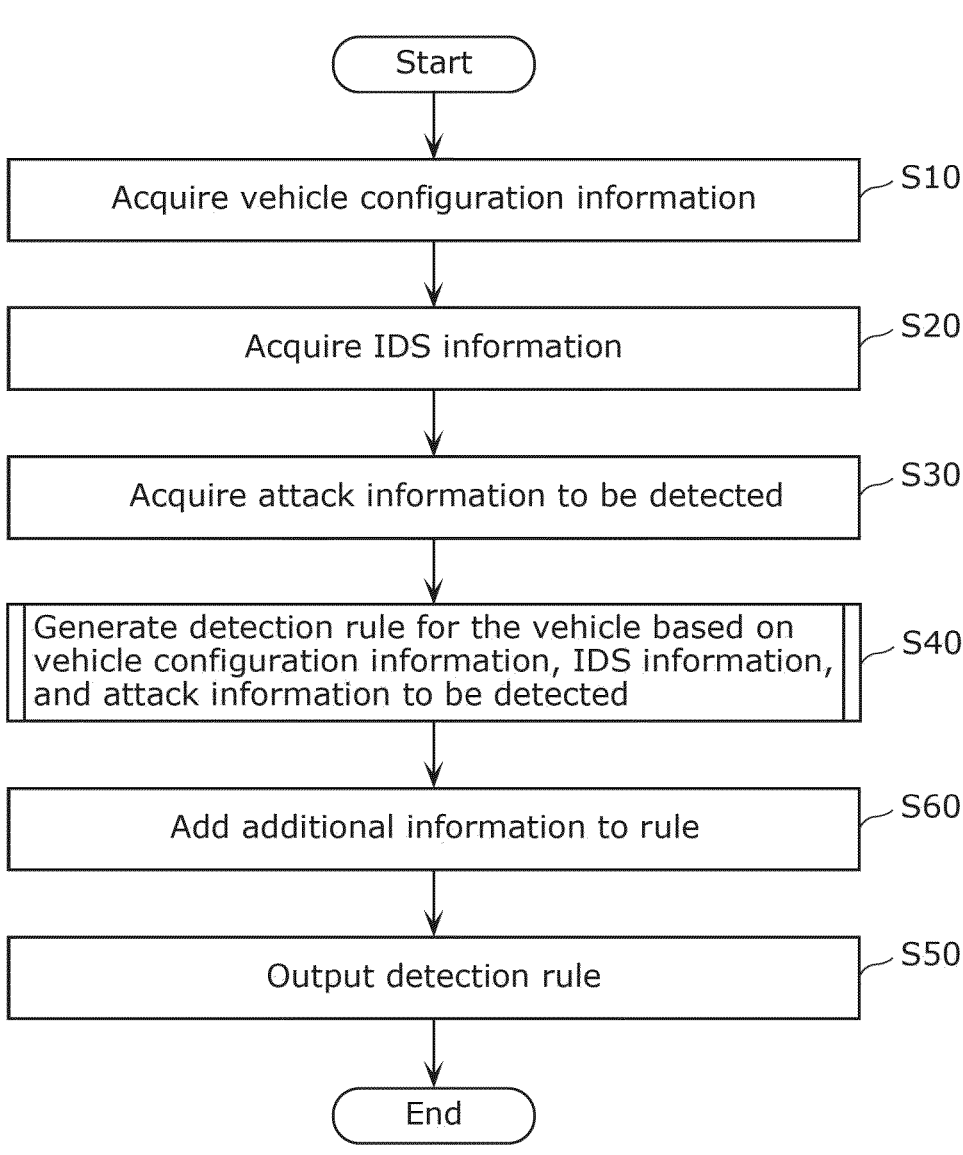
FIG. 12 is a flowchart illustrating an operation performed by the detection rule generation device according to Embodiment 2.

As shown in FIG. 12, after a detection rule has been generated in step S40, provider for additional information to the rule 43 of detection rule generator 40a adds additional information to the rule to the generated detection rule (S60). The additional information to the rule is added to, for example, each detection rule. Step S60 is an example of an adding step.

The additional information to the rule is acquired via acquirer for additional information to the rule 60 before, for example, step S60 is performed. The step of acquiring additional information to the rule is an example of a fourth acquiring step.

Next, in step S50, provider for additional information to the rule 43 outputs the detection rule to which the additional information to the rule has been added.

With this configuration, additional information to the rule can be added to the generated detection rule, and thus, for example, the in-vehicle monitoring device can use the additional information to the rule when abnormality detection using the detection rule is performed in the vehicle or the like. For example, in the case where the additional information to the rule includes priority, when an abnormality that satisfies one detection rule is detected, the in-vehicle monitoring device can determine, based on the detection rule priority, whether a notification indicating the abnormality should be transmitted to the SOC. Accordingly, with detection rule generation device 1a, in the case where, for example, an abnormality is detected the vehicle or the like, it is possible to effectively determine whether it is necessary to output a notification indicating the abnormality.

Embodiment 3

Hereinafter, a detection rule generation device and the like according to the present embodiment will be described with reference to FIGS. 13 and 14. In the following description, differences from Embodiment 1 will be mainly described, and a description of details that are the same as or similar to those of Embodiment 1 may be omitted or simplified.

[3-1. Configuration of Detection Rule Generation Device]

First, a configuration of the detection rule generation device according to the present embodiment will be described with reference to FIG. 13. FIG. 13 is a block diagram showing a functional configuration of detection rule generation device 1b according to the present embodiment. Detection rule generation device 1b according to the present embodiment is different from detection rule generation device 1 according to Embodiment 1 in that detection rule generation device 1b includes acquirer for information for narrowing rules 70 and rule narrower 80.

Figure 13:
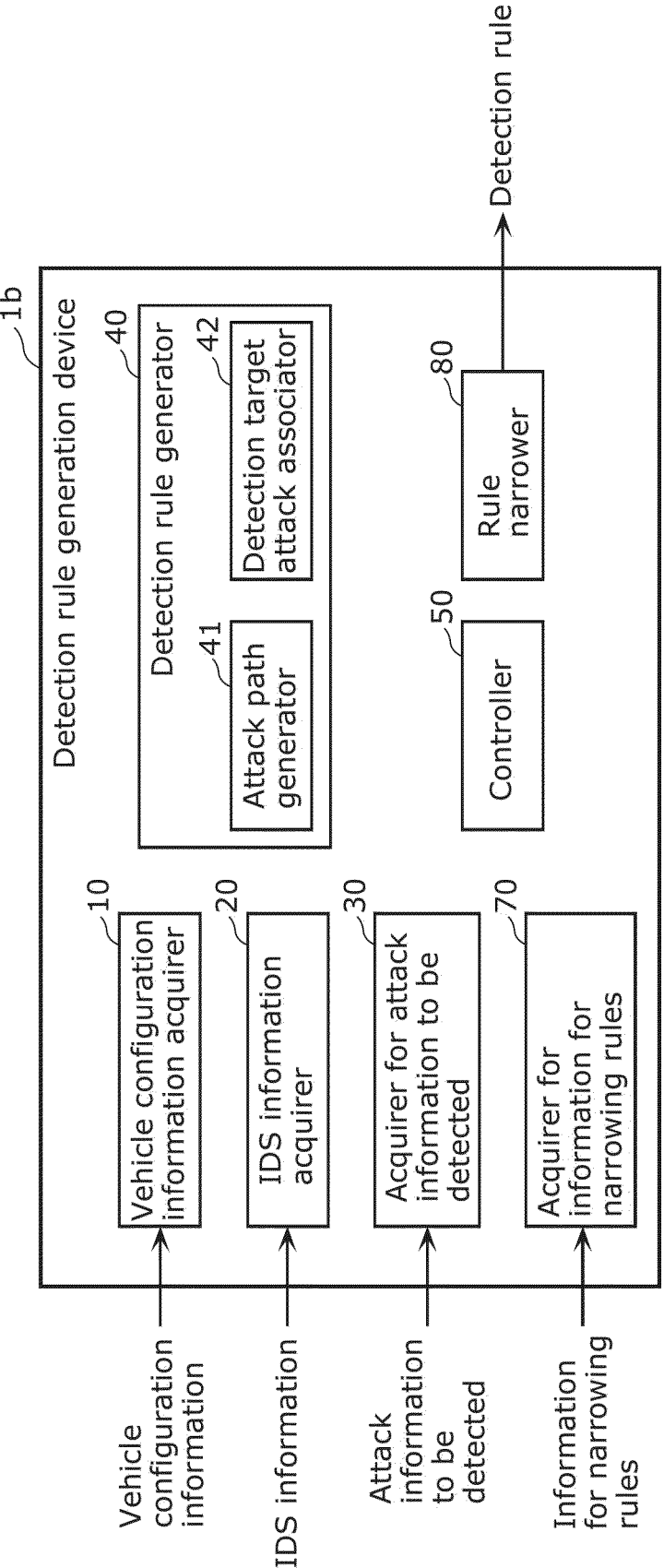
FIG. 13 is a block diagram showing a functional configuration of a detection rule generation device according to Embodiment 3.

As shown in FIG. 13, detection rule generation device 1b includes acquirer for information for narrowing rules 70 and rule narrower 80 in addition to the structural elements of detection rule generation device 1 according to Embodiment 1.

Acquirer for information for narrowing rules 70 acquires information for narrowing rules used to extract a desired detection rule from among a plurality of detection rules. Acquirer for information for narrowing rules 70 may receive the information for narrowing rules through communication, or may receive the information for narrowing rules by user input.

The information for narrowing rules is information indicating a narrowing condition for rule narrower 80 to narrow down the detection rules. The information for narrowing rules may include information indicating that a detection rule including a specific attack path is to be excluded, and information indicating that a detection rule including an unlikely combination of abnormalities is to be excluded. The information includes, for example, a specific attack path and a list of unlikely combinations of abnormalities. The specific attack path may be an abnormality generation path that is set in advance and in which, for example, an abnormality may occur during vehicle inspection or the like. Also, the unlikely combinations of abnormalities include an unlikely order of ECUs where an abnormality occurs, an unlikely order of abnormality detection logs generated, or the like.

Also, the information for narrowing rules may include information indicating that the detection rules are narrowed down such that only a detection rule in which any one of risk value and the like included in the additional information to the rule described in Embodiment 2 exceeds a threshold value (for example, only the detection rule) is output, or information indicating that a detection rule that matches the pre-defined attack (for example, only the detection rule) is output. Whether the detection rule matches the pre-defined attack may be determined by, for example, determining whether the flag shown in Embodiment 2 has been set up.

As described above, the information for narrowing rules may include, for example, information indicating that a detection rule in which at least one of the priority, the risk value, the occurrence possibility, or the similarity is greater than or equal to a threshold value is to be extracted from among the plurality of detection rules. Also, the information for narrowing rules may include information indicating that a detection rule in which the pre-defined attack and the attack scenario match is to be extracted.

In the case where the information for narrowing rules includes details of the additional information to the rule, for example, detection rule generation device 1b may include acquirer for additional information to the rule 60 and provider for additional information to the rule 43 according to Embodiment 2.

Acquirer for information for narrowing rules 70 may store the acquired information for narrowing rules in a storage (not shown).

Rule narrower 80 extracts one or more detection rules to be output from among the plurality of detection rules based on the information for narrowing rules generated by detection rule generator 40. Rule narrower 80 extracts one or more detection rules to be output from among the plurality of detection rules generated by detection rule generator 40 based on whether there is a portion that matches the information for narrowing rules. Rule narrower 80 may also function as an outputter.

[3-2. Operation of Detection Rule Generation Device]

Next, an operation performed by detection rule generation device 1b configured as described above will be described with reference to FIG. 14. FIG. 14 is a flowchart illustrating an operation (a detection rule generation method) performed by detection rule generation device 1b according to the present embodiment. The flowchart shown in FIG. 14 includes step S70 in addition to the steps included in the flowchart shown in FIG. 6.

Figure 14:
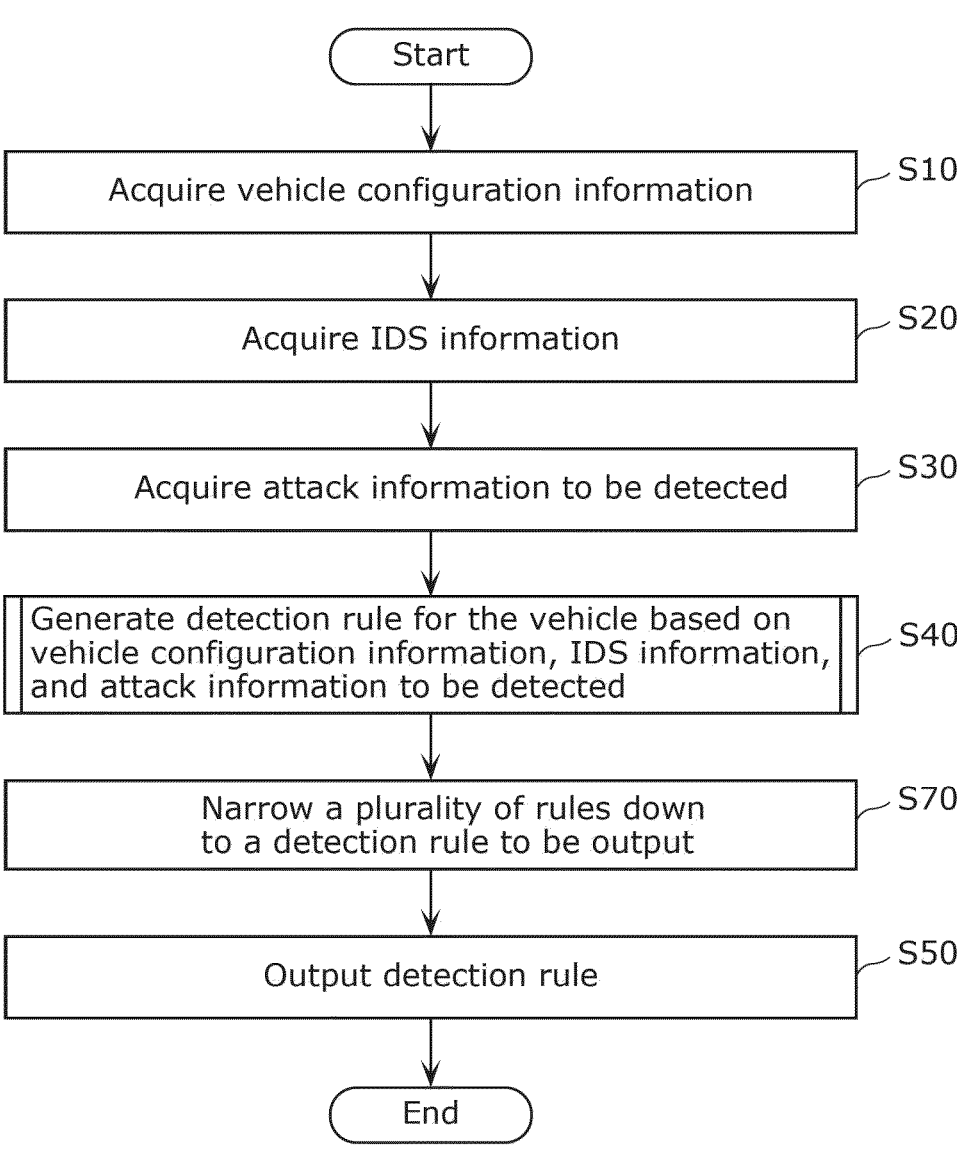
FIG. 14 is a flowchart illustrating an operation performed by the detection rule generation device according to Embodiment 3.

As shown in FIG. 14, after a detection rule has been generated in step S40, detection rule generation device 1b narrows the plurality of generated rules down to a detection rule to be output (detection rules) (S70). Detection rule generation device 1b narrows the plurality of detection rules down to one or more detection rules based on information for narrowing rules. Step S70 is an example of a narrowing-down step.

The information for narrowing rules is acquired via acquirer for information for narrowing rules 70 before, for example, step S70 is performed. The step of acquiring information for narrowing rules is an example of a fifth acquiring step.

Next, rule narrower 80 outputs the detection rule resulting from narrowing down the detection rules in step S70.

With this configuration, detection rule generation device 1b can output a detection rule that does not include an attack that does not need to be detected, or a detection rule that includes an attack to be detected. For example, in the in-vehicle monitoring device, an attack on the vehicle can be effectively detected.

Embodiment 4

[4-1. Configuration of Abnormality Detection System]

Figure 15:
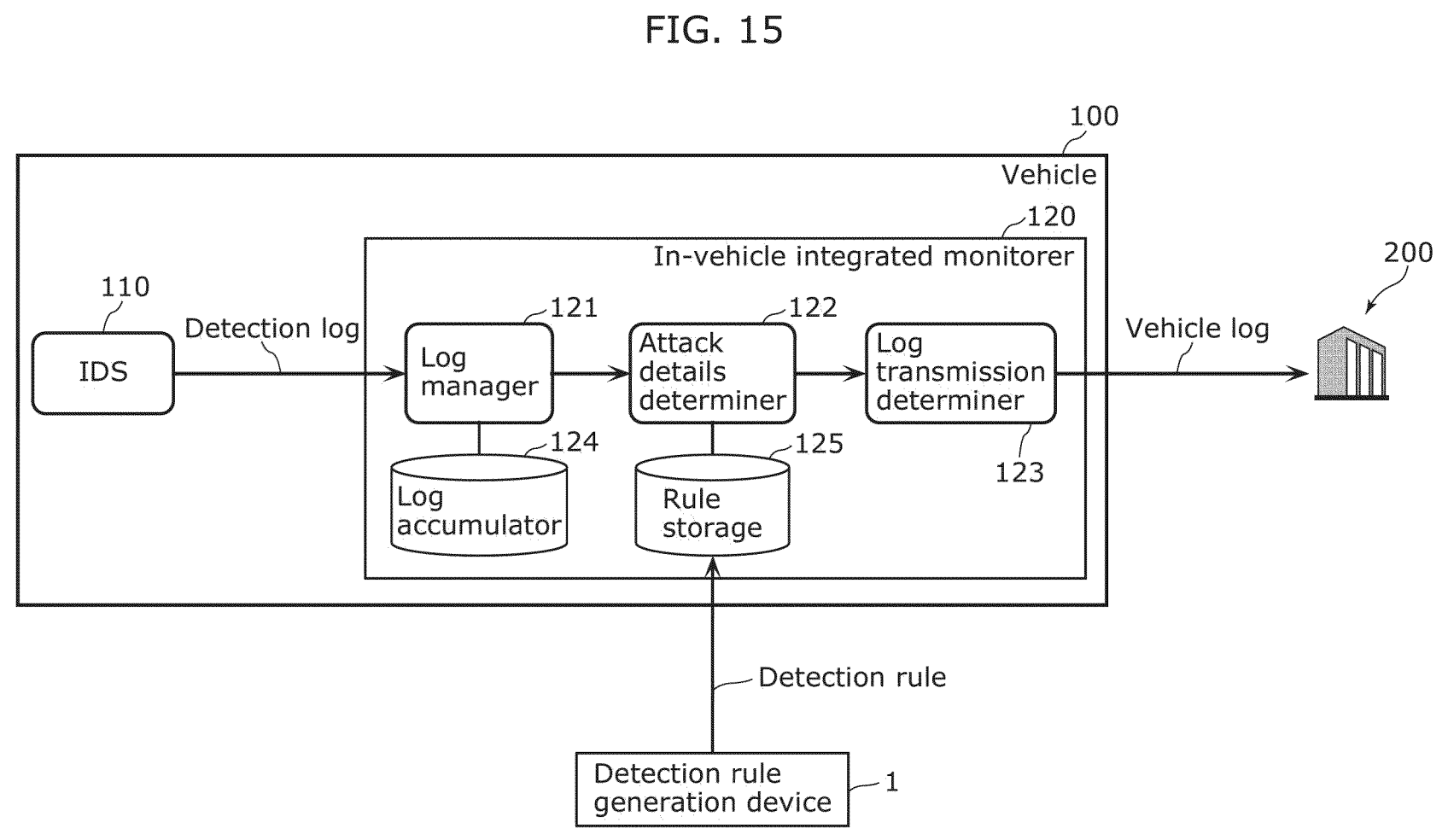

Next, an abnormality detection system that detects an abnormality based on a detection rule generated by the detection rule generation device described above will be described with reference to FIGS. 15 to 18. FIG. 15 is a block diagram showing a first example of a functional configuration of an abnormality detection system that uses a detection rule generated by the detection rule generation device according to the present embodiment (detection rule generation device 1 according to Embodiment 1 shown in FIG. 15). FIG. 15 shows an example in which detection rule generation device 1 generates a detection rule used by in-vehicle integrated monitorer 120 (an example of an in-vehicle monitoring device) mounted in vehicle 100, and outputs the detection rule to in-vehicle integrated monitorer 120.

The following description will be given using detection rule generation device 1 according to Embodiment 1. However, it is also possible to use detection rule generation device 1a or 1b.

As shown in FIG. 15, the abnormality detection system includes detection rule generation device 1, vehicle 100, and security operation center (SOC) 200.

Vehicle 100 includes IDS 110 and in-vehicle integrated monitorer 120.

IDS 110 monitors the ECUs, and outputs a detection log to in-vehicle integrated monitorer 120 when an abnormality is detected in one of the ECUs monitored by IDS 110. The detection log shown in FIG. 15 is an example of log information.

In-vehicle integrated monitorer 120 monitors vehicle 100. When it is determined, based on time-series data of the detection log output from IDS 110, that an attack has occurred, in-vehicle integrated monitorer 120 outputs a notification indicating the occurrence of the attack to SOC 200. In-vehicle integrated monitorer 120 includes log manager 121, attack details determiner 122, log transmission determiner 123, log accumulator 124, and rule storage 125.

Log manager 121 acquires a detection log from each IDS 110, and manages the acquired detection logs. Specifically, log manager 121 stores the acquired detection logs in log accumulator 124 and outputs the detection logs to attack details determiner 122. Log manager 121 functions as an acquirer.

Attack details determiner 122 determines attack details based on the detection logs acquired from log manager 121 and the detection rules stored in rule storage 125. Attack details determiner 122 determines whether there is an abnormality that matches the detection rules (for example, an abnormality that matches the abnormality occurrence order in time series or the like). Attack details determiner 122 is an example of a determiner.

Log transmission determiner 123 determines whether to transmit the attack details determined by attack details determiner 122 to SOC 200 as a vehicle log. For example, log transmission determiner 123 determines, based on the attack details and the additional information to the rule, whether to transmit the vehicle log to SOC 200. For example, if the risk value of the detection rule determined by attack details determiner 122 as matching is greater than or equal to a threshold value, log transmission determiner 123 may determine that a vehicle log that includes a notification indicating the occurrence of the abnormality in the detection rule is to be transmitted to SOC 200. The vehicle log may be transmitted directly to SOC 200. Alternatively, the vehicle log may be obtained by an operator such as a dealer by using a diagnostic machine, and the operator may transmit the vehicle log to SOC 200.

Log accumulator 124 accumulates the detection logs acquired from IDS 110 for a predetermined period of time.

Rule storage 125 that accumulates the detection rules generated by detection rule generation device 1 is an example of a storage device included in a security system.

Log accumulator 124 and rule storage 125 may be implemented by, for example, a single semiconductor memory or the like, or may be implemented by different semiconductor memories or the like.

In-vehicle integrated monitorer 120 is an example of a security system that determines attack details based on the log information of vehicle 100.

In-vehicle integrated monitorer 120 does not necessarily need to be mounted in vehicle 100. FIG. 16 is a block diagram showing a second example of a functional configuration of an abnormality detection system that uses a detection rule generated by the detection rule generation device according to the present disclosure. FIG. 16 shows an example in which the detection rule is used by vehicle SIEM 210.

As shown in FIG. 16, for example, vehicle security information and event manager (vehicle SIEM) 210 of SOC 200a includes, as with in-vehicle integrated monitorer 120, log manager 211 (an example of an acquirer), attack details determiner 212 (an example of a determiner), log accumulator 213, and rule storage 214 (an example of a storage device included in the security system). That is, at least a portion of the structural elements of in-vehicle integrated monitorer 120 may be included in SOC 200a.

The configurations of log manager 211, attack details determiner 212, log accumulator 213, and rule storage 214 are the same as those of log manager 121, attack details determiner 122, log accumulator 124, and rule storage 125 shown in FIG. 15. Accordingly, a description thereof will be omitted.

As shown in FIG. 16, vehicle SIEM 210 of SOC 200a acquires a vehicle log including detection logs of IDS 110 from vehicle 100a, and outputs a result of analysis to operator H based on the acquired vehicle log and the detection rule generated by detection rule generation device 1. The vehicle log shown in FIG. 16 is an example of log information.

SOC 200a is an example of a security system that determines attack details based on the log information of vehicle 100a. Also, vehicle SIEM 210 is implemented by, for example, a server included in SOC 200a.

As shown in FIGS. 15 and 16, the detection rule generated by detection rule generation device 1 is used by at least one of vehicle 100 or SOC 200a that monitors vehicle 100a.

[4-2. Operation of Abnormality Detection System]

Figure 17:
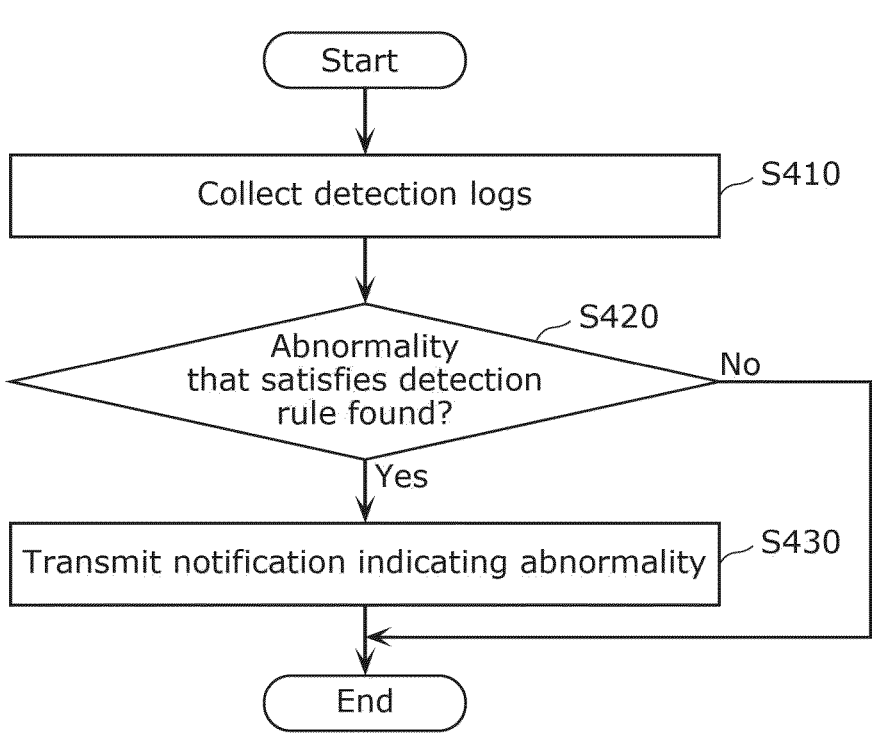
FIG. 17 is a flowchart illustrating a first example of an abnormality detection operation performed by the abnormality detection system according to the present embodiment.
Figure 18:
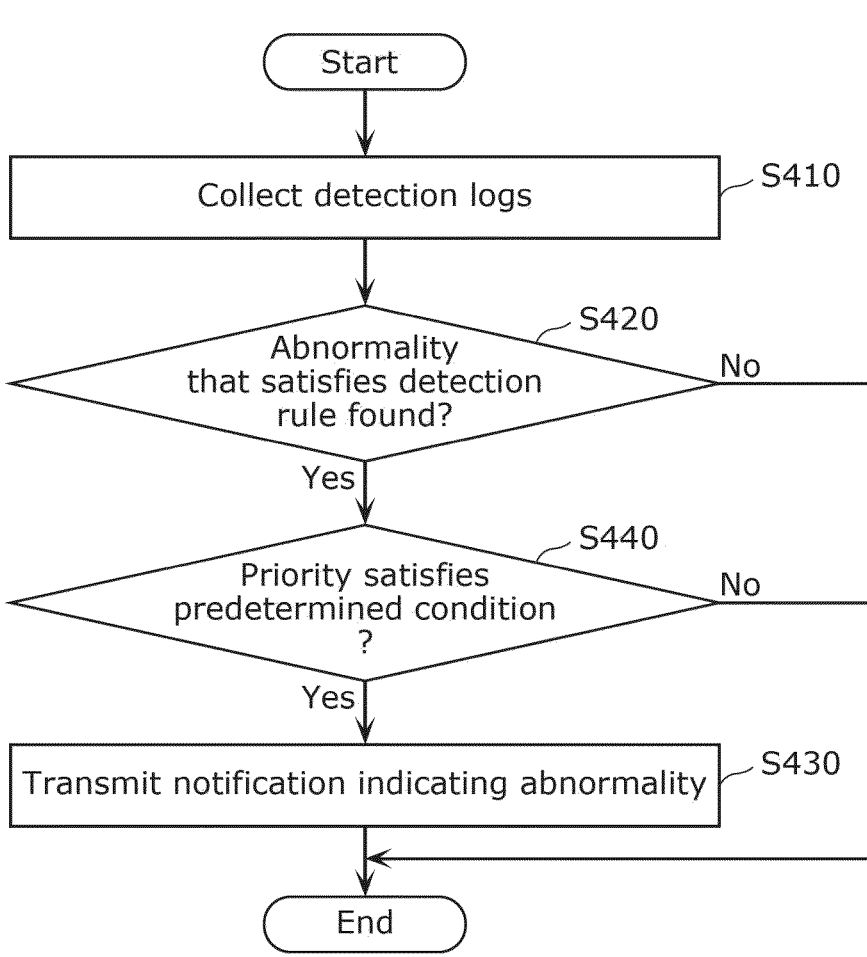
FIG. 18 is a flowchart illustrating a second example of an abnormality detection operation performed by the abnormality detection system according to the present embodiment.

An operation performed by the abnormality detection system configured as described above will be described with reference to FIGS. 17 and 18. FIG. 17 is a flowchart illustrating a first example of an abnormality detection operation performed by the abnormality detection system according to the present embodiment. FIG. 18 is a flowchart illustrating a second example of an abnormality detection operation performed by the abnormality detection system according to the present embodiment. Either one of the abnormality detection systems shown in FIGS. 15 and 16 performs the operation shown in FIG. 17 or 18.

As shown in FIG. 17, log manager 121 collects detection logs from each IDS 110 (S410). Log manager 121 collects detection logs, for example, for a predetermined period of time.

Next, attack details determiner 122 determines, based on the detection logs acquired from log manager 121 and the detection rules stored in rule storage 125, whether there is an abnormality that satisfies the detection rules (S420). If it is determined that there is an abnormality that satisfies the detection rules (Yes in S420), attack details determiner 122 transmits a notification indicating the abnormality (S430). If it is determined that there is no abnormality that satisfies the detection rules (No in S420), the processing ends.

Also, as shown in FIG. 18, the flowchart shown in FIG. 17 may further include step S440. Step S440 shows an operation in the case where the priority is included as the additional information to the rule.

If Yes is determined in step S420, attack details determiner 122 further determines whether the priority satisfies a predetermined condition (S440). The predetermined condition may be, for example, a condition in which the priority level is greater than or equal to a threshold value. If the priority level is greater than or equal to the threshold value in the detection rule (Yes in S440), attack details determiner 122 proceeds to step S430. If the priority level is less than the threshold value in the detection rule (No in S440), the processing ends.

Other Embodiments

The detection rule output method and the like according to one or more aspects of the present disclosure have been described based on the embodiments given above. However, the present disclosure is not limited to the embodiments given above. Other embodiments obtained by making various modifications that can be conceived by a person having ordinary skill in the art to the above embodiments as well as embodiments constructed by combining structural elements of different embodiments without departing from the scope of the present invention may also be included within the scope of the present disclosure.

For example, in the embodiments and the like given above, an example was described in which the detection rule generation device generates a detection rule based on the vehicle configuration information, the IDS information, and the attack information to be detected. However, the configuration is not limited thereto. For example, the detection rule may be generated based on at least one of the vehicle configuration information, the IDS information, or the attack information to be detected.

Also, in the embodiments and the like described above, the detection target attack associator may further determine a missing IDS in the detection rule. The detection target attack associator may determine, for example, whether there is an ECU to which a monitoring IDS is not assigned in the detection rule shown in FIG. 9B or 10B. If it is determined that there is an ECU to which a monitoring IDS is not assigned, the detection target attack associator may determine that "an IDS is missing in the ECU" and generate an alert. The detection target attack associator may inform that "an IDS is missing in the ECU" by using, for example, an image or audio. It can also be said that the detection target attack associator informs that there is missing information in the IDS information.

Also, in the embodiments and the like described above, the detection target attack associator may also determine a failure in detecting an attack in the detection rule. The detection target attack associator may determine, for example, based on the detection rule shown in FIG. 9B or 10B and the attack information to be detected, whether there is a detection target attack that is assigned to none of the IDSes. If it is determined that there is a detection target attack that is assigned to none of the IDSes, the detection target attack associator may determine that "a failure has occurred in detecting a detection target attack", and generate an alert. The detection target attack associator may inform that "a failure has occurred in detecting a detection target attack" by using, for example, an image or audio.

Also, the SOC according to the embodiments and the like given above is also called "vehicle security operation center (VSOC)". The vehicle is not limited to an automobile, and may be a motorcycle, a train, or the like. The detection rule according to the embodiments and the like given above may also be used in, for example, a mobile body that is other than the vehicle and can perform communication with an external device. The mobile body may be am autonomous robot such as a delivery robot, a flying body such as a drone, a vessel, or the like.

Also, there is no particular limitation on the communication standard used in the in-vehicle network used in the embodiments and the like given above. Controller Area Network (CAN), Ethernet (registered trademark), FlexRay, LIN, Media Oriented Systems Transport (MOST), or the like, or any combination thereof may be used.

Also, in the embodiments and the like described above, the structural elements may be configured using dedicated hardware, or may be implemented by executing a software program suitable for the structural elements. The structural elements may be implemented by a program executor such as a CPU or a processor reading and executing a software program recorded in a recording medium such as a hard disk or a semiconductor memory.

Also, the order of steps performed in each of the flowcharts is merely an example to specifically describe the present disclosure. Accordingly, the steps of each of the flowcharts may be performed in an order other than those described above. Also, a portion of the steps may be performed simultaneously (in parallel) with the other steps, or a portion of the steps may not necessarily be performed.

Also, the functional blocks shown in the block diagrams are merely examples. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

Also, the detection rule generation device according to the embodiments and the like given above may be implemented as a single device, or may be implemented by a plurality of devices. In the case where the detection rule generation device is implemented by a plurality of devices, the functions of the structural elements of the detection rule generation device may be assigned to the plurality of devices in any way. Alternatively, in the case where the detection rule generation device is implemented by a plurality of devices, the communication method for performing communication between the plurality of devices is not specifically limited, and may be wireless communication or wired communication. Also, the communication between the plurality of devices may also be performed using a combination of wireless communication and wired communication.

Also, the structural elements described in the embodiments and the like given above may be implemented as software, and may be typically implemented as LSIs, which are integrated circuits. These may be individual single chips, or some or all of these may be configured in a single chip. Here, LSIs are mentioned, but the LSIs may be each called IC, system LSI, super LSI, or ultra LSI according to the degree of integration. Also, implementation of an integrated circuit is not limited to LSIs, and may be implemented by a dedicated circuit (a general-purpose circuit that executes a dedicated program) or a general-purpose processor. It is also possible to use a field programmable gate array (FPGA) that can be programmed after LSI production or a reconfigurable processor that enables reconfiguration of the connection and setting of circuit cells in the LSI. Furthermore, if a technique for implementing an integrated circuit that can replace LSIs appears by another technique resulting from the progress or derivation of semiconductor technology, the structural elements may be integrated by using that technique.

The system LSI is a super multifunctional LSI manufactured by integrating a plurality of processors on a single chip, and is specifically a computer system that includes a microprocessor, a read only memory (ROM), a random access memory (RAM), and the like. A computer program is stored in the ROM. The functions of the system LSI are implemented as a result of the microprocessor operating in accordance with the computer program.

Also, an aspect of the present disclosure may be a computer program that causes a computer to execute the characteristic steps included in any of the detection rule generation methods and the detection rule output methods shown in FIGS. 6, 7A, 8A, 9A, 10A, 12, and 14 and the abnormality detection methods shown in FIGS. 17 and 18.

Also, for example, the program may be a program executed by a computer. Also, an aspect of the present disclosure may be a computer-readable non-transitory recording medium in which the program is recorded. For example, the program may be recorded in the recording medium, and then widely spread or distributed. For example, the widely spread program may be installed on a device that includes a processor. By causing the processor to execute the program, it is possible to cause the device to perform the processing operations described above.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2021-134255 filed on Aug. 19, 2021, and PCT International Application No. PCT/JP2022/024699 filed on Jun. 21, 2022.

INDUSTRIAL APPLICABILITY

The present disclosure is useful for a device or the like that creates detection rules for detecting abnormalities in a vehicle.

The invention claimed is:

1. A detection rule output method for outputting a detection rule used in a security system that determines attack details based on log information of a vehicle, the detection rule output method comprising:

acquiring vehicle configuration information regarding a configuration of an in-vehicle network provided in the vehicle, intrusion detection system (IDS) information regarding one or more intrusion detection systems (IDSes) mounted in the vehicle, and attack information to be detected regarding an attack on the vehicle to be detected;

generating an attack path based on the vehicle configuration information;

generating the detection rule that includes at least one of the attack path, abnormality details indicating details of the abnormality that has occurred in the vehicle, or a scenario of the attack, in which the attack path is associated with the attack details based on the IDS information and the attack information to be detected; and outputting, to a storage device included in the security system, the detection rule that is for detecting a location in the vehicle where an abnormality has occurred and the abnormality that has occurred in the location.

2. The detection rule output method according to claim 1, wherein the vehicle configuration information includes:

first electronic control unit (ECU) information indicating a plurality of ECUs mounted in the vehicle;

second ECU information regarding a first ECU that is an entry point of the attack on the vehicle and a second ECU that is an attack target among the plurality of ECUs; and connection information indicating a connection relationship between the plurality of ECUs, and the detection rule is generated based on the first ECU information, the second ECU information, and the connection information, to include a depth of each of the plurality of ECUs from the entry point.

3. The detection rule output method according to claim 2, wherein the detection rule is generated by:

identifying, based on the first ECU information, the second ECU information, and the connection information, a mounting location indicating a position of each of the plurality of ECUs in a relative connection relationship between the plurality of ECUs from the entry point; and assigning, based on the mounting location identified, the depth when an abnormality occurs in each of the plurality of ECUs.

4. The detection rule output method according to claim 2, wherein the depth of each of the plurality of ECUs is a number of devices passed through from the entry point of the attack on the vehicle to the second ECU, or a number of layers having an equal security policy passed through from the entry point of the attack on the vehicle to the second ECU.

5. The detection rule output method according to claim 1, wherein the vehicle configuration information includes:

first electronic control unit (ECU) information indicating a plurality of ECUs mounted in the vehicle;

second ECU information regarding a first ECU that is an entry point of the attack on the vehicle and a second ECU that is an attack target among the plurality of ECUs; and connection information indicating a connection relationship between the plurality of ECUs, and the detection rule is generated based on the first ECU information, the second ECU information, and the connection information, to include the attack path including the first ECU as a start point of the attack and the second ECU as an end point of the attack.

6. The detection rule output method according to claim 5, wherein the detection rule is generated by:

determining the first ECU and the second ECU based on the second ECU information; and comprehensively deriving, based on the first ECU information and the connection information, the attack path between the first ECU and the second ECU.

7. The detection rule output method according to claim 1, wherein the vehicle configuration information includes first electronic control unit (ECU) information indicating a plurality of ECUs mounted in the vehicle, the IDS information includes: monitoring IDS information indicating the one or more IDSes that monitor the plurality of ECUs mounted in the vehicle; and output detection log information indicating a detection log output when the one or more IDSes detect the abnormality in the plurality of ECUs, and the detection rule is generated based on the first ECU information, the monitoring IDS information, the output detection log information, and the attack information, to include the abnormality details.

8. The detection rule output method according to claim 7, wherein the detection rule is generated by:

assigning, based on the first ECU information and the attack information, a potential attack that possibly occurs on each of the plurality of ECUs;

assigning, based on the monitoring IDS information, an IDS that detects the attack; and assigning, based on the output detection log information, a detection log output by each of the one or more IDSes when the attack is detected.

9. The detection rule output method according to claim 1, wherein the vehicle configuration information includes:

first electronic control unit (ECU) information indicating a plurality of ECUs mounted in the vehicle;

second ECU information regarding, out of the plurality of ECUs, a first ECU that is an entry point of the attack on the vehicle and a second ECU that is an attack target; and connection information indicating a connection relationship between the plurality of ECUs, the IDS information includes: monitoring IDS information indicating the one or more IDSes that monitor the plurality of ECUs mounted in the vehicle; and output detection log information indicating a detection log output when the one or more IDSes detect the abnormality in the plurality of ECUs, and the detection rule is generated by:

deriving, based on the first ECU information, the second ECU information, and the connection information, the attack path including the first ECU as a start point of the attack and the second ECU as an end point of the attack;

deriving, based on the first ECU information, the monitoring IDS information, the output detection log information, and the attack detection target information, the abnormality details; and including the scenario of the attack in which the attack path and the abnormality details are combined.

10. The detection rule output method according to claim 9, wherein the attack path includes the first ECU as the start point of the attack and the second ECU as the end point of the attack and is comprehensively derived based on the first ECU information, the second ECU information, and the connection information, and the abnormality details is derived by:

assigning, based on the first ECU information and the attack information, a potential attack that possibly occurs on each of a plurality of ECUs that constitute the attack path;

assigning, based on the monitoring IDS information, an IDS that detects the attack; and assigning, based on the output detection log information, a detection log output by each of the one or more IDSes when the attack is detected.

11. The detection rule output method according to claim 1, wherein additional information is added to the detection rule, and the detection rule to which the additional information has been added is output to the storage device.

12. The detection rule output method according to claim 11, wherein the additional information includes at least one of a detection rule priority, a risk value corresponding to a degree of influence, an occurrence possibility corresponding to ease of attack associated with a plurality of ECUs mounted in the vehicle, a similarity to a pre-defined attack, or a flag indicating that the detection rule matches the pre-defined attack.

13. The detection rule output method according to claim 1, wherein a plurality of detection rules is generated based on the vehicle configuration information, the IDS information, and the attack information, and one or more detection rules are output to the storage device, the one or more detection rules resulting from narrowing down the plurality of detection rules, based on information for narrowing the plurality of detection rules down to the one or more detection rules that are to be output to the storage device.

14. The detection rule output method according to claim 13, wherein the information for narrowing the plurality of detection rules includes one of:

information indicating that at least one of a detection rule including a specific attack path or a detection rule including an unlikely combination of abnormalities is to be excluded; or information indicating that at least one of a detection rule whose degree of influence on the vehicle is a predetermined level or more or a detection rule that matches a pre-defined attack is to be output.

15. The detection rule output method according to claim 1, wherein the storage device is provided in at least one of the vehicle or a server included in a security operation center (SOC) that monitors the vehicle, and the detection rule is outputted to the storage device provided in the at least one of the vehicle or the server included in the SOC.

16. A security system comprising:

a storage that stores the detection rule outputted by using the detection rule output method according to claim 1;

a communication interface that acquires the log information; and a processor that determines the attack details of the attack on the vehicle based on the detection rule and the log information.

17. A detection rule output device that outputs a detection rule used in a security system that determines attack details based on log information of a vehicle, the detection rule output device comprising:

a communication interface that acquires vehicle configuration information regarding a configuration of an in-vehicle network provided in the vehicle, intrusion detection system (IDS) information regarding one or more intrusion detection systems (IDSes) mounted in the vehicle, and attack information to be detected regarding an attack on the vehicle to be detected;

a processor; and a memory including a program that, when executed by the processor, causes the processor to:

generate an attack path based on the vehicle configuration information;

generate the detection rule that includes at least one of the attack path, abnormality details indicating details of the abnormality that has occurred in the vehicle, or a scenario of the attack, in which the attack path is associated with the attack details based on the IDS information and the attack information to be detected; and output, to a storage device included in the security system, the detection rule that is for detecting a location in the vehicle where an abnormality has occurred and the abnormality that has occurred in the location.

* * * * *